United States Patent
Cunningham et al.

(10) Patent No.: US 11,726,937 B2
(45) Date of Patent: Aug. 15, 2023

(54) CONTROL OF DATA SENDING FROM A MULTI-PROCESSOR DEVICE

(71) Applicant: Graphcore Limited, Bristol (GB)

(72) Inventors: Graham Bernard Cunningham, Chippenham (GB); Stephen Felix, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 1 day.

(21) Appl. No.: 17/447,832

(22) Filed: Sep. 16, 2021

(65) Prior Publication Data

US 2022/0414040 A1     Dec. 29, 2022

(30) Foreign Application Priority Data

Jun. 25, 2021 (GB) ...................................... 2109193

(51) Int. Cl.
*G06F 13/364* (2006.01)
*G06F 9/52* (2006.01)
*G06F 13/40* (2006.01)

(52) U.S. Cl.
CPC ............ *G06F 13/364* (2013.01); *G06F 9/522* (2013.01); *G06F 13/4059* (2013.01)

(58) Field of Classification Search
CPC ..... G06F 13/364; G06F 13/4059; G06F 9/522
See application file for complete search history.

(56) References Cited

U.S. PATENT DOCUMENTS

| | | | | |
|---|---|---|---|---|
| 9,215,174 B2 * | 12/2015 | Kwan | ...................... | H04L 47/30 |
| 9,338,105 B2 * | 5/2016 | Griswold | ............ | H04L 49/9063 |
| 10,452,396 B2 * | 10/2019 | Knowles | ................. | G06F 15/80 |
| 10,558,595 B2 | 2/2020 | Wilkinson | ................ | G06F 9/00 |
| 11,048,563 B2 * | 6/2021 | Wilkinson | ............. | G06F 9/485 |
| 11,461,175 B1 * | 10/2022 | Felix | .................... | G06F 11/1068 |
| 2002/0107903 A1 * | 8/2002 | Richter | ................... | H04L 43/00 709/251 |
| 2014/0112128 A1 * | 4/2014 | Kwan | ..................... | H04L 47/30 370/230 |
| 2019/0121387 A1 * | 4/2019 | Knowles | ................... | G06F 9/46 |
| 2019/0121638 A1 * | 4/2019 | Knowles | ............... | G06F 9/4887 |
| 2019/0121680 A1 * | 4/2019 | Wilkinson | ............ | G06F 9/3851 |
| 2019/0155768 A1 * | 5/2019 | Wilkinson | .......... | G06F 13/4282 |

OTHER PUBLICATIONS

Search and Examination Report dated Apr. 8, 2022 for United Kingdom Patent Application No. GB2109193.9 3 pages.

* cited by examiner

*Primary Examiner* — Brian T Misiura
(74) *Attorney, Agent, or Firm* — Haynes and Boone LLP

(57) ABSTRACT

A method for controlling the sending of data by a plurality of processors belonging to a device, the method comprising: sending a first message to a first processor of the plurality of processors to grant permission to the first processor of the plurality of processors to send a first set of data packets over at least one external interface of the device; receiving from the first processor, an identifier of a second processor of the plurality of processors; and in response to receipt of the identifier of the second processor, send a second message to the second processor to grant permission to the second processor to send a second set of data packets over the at least one external interface.

29 Claims, 18 Drawing Sheets

CONTROL OF DATA SENDING FROM A MULTI-PROCESSOR DEVICE

CROSS-REFERENCE TO RELATED APPLICATIONS

The present application claims priority to United Kingdom Patent Application No. GB2109193.9, filed Jun. 25, 2021, the disclosure of which is hereby incorporated herein by reference in its entirety.

TECHNICAL FIELD

The present disclosure relates to sending data from a multi-processor device and, in particular, to a device having at least one exchange circuit for granting permission to processors of the device to send data.

BACKGROUND

Parallelism in computing takes different forms. Program fragments may be organised to execute concurrently (where they overlap in time but may share execution resources) or in parallel where they execute on different resources, possibly at the same time.

Parallelism in computing can be achieved in a number of ways, such as by means of an array of multiple interconnected processor tiles, or a multi-threaded processing unit, or indeed a multi-tile array in which each tile comprises a multi-threaded processing unit.

When parallelism is achieved by means of a processing unit comprising an array of multiple tiles on the same chip (or chips in the same integrated circuit package), each tile comprises its own separate respective processing unit with local memory (including program memory and data memory). Thus separate portions of program code can be run concurrently on different tiles. The tiles are connected together via an on-chip interconnect, which enables the code run on the different tiles to communicate between tiles. In some cases, the processing unit on each tile may take the form of a barrel-threaded processing unit (or other multi-threaded processing unit). Each tile may have a set of contexts and an execution pipeline such that each tile can run multiple interleaved threads concurrently.

An example use of multi-threaded and/or multi-tiled parallel processing is found in machine intelligence. As will be familiar to those skilled in the art of machine intelligence, machine intelligence algorithms are capable of producing knowledge models and using the knowledge model to run learning and inference algorithms. A machine intelligence model incorporating the knowledge model and algorithms can be represented as a graph of multiple interconnected nodes. Each node represents a function of its inputs. Some nodes receive the inputs to the graph and some receive inputs from one or more other nodes. The output activation of some nodes form the inputs of other nodes, and the output of some nodes provide the output of the graph, and the inputs to the graph provide the inputs to some nodes. Further, the function at each node is parameterized by one or more respective parameters, e.g. weights. During a learning stage the aim is, based on a set of experiential input data, to find values for the various parameters such that the graph as a whole will generate a desired output for a range of possible inputs. Various algorithms for doing this are known in the art, such as a back propagation algorithm based on stochastic gradient descent. Over multiple iterations the parameters are gradually tuned to decrease their errors, and thus the graph converges toward a solution. In a subsequent stage, the learned model can then be used to make predictions of outputs given a specified set of inputs or to make inferences as to inputs (causes) given a specified set of outputs, or other introspective forms of analysis can be performed on it.

SUMMARY

When multiple processors are formed together as part of the same device (e.g. a chip), one challenge is how to co-ordinate the sending of data by those processors to destinations external to the device. The available bandwidth to destinations external to the device may be limited such that it is not possible for each processor to simultaneously transmit data to destinations external to the device.

According to a first aspect, there is provided a data processing device comprising: a plurality of processors; at least one exchange circuit for controlling the sending of data packets by the plurality of processors, at least one external interface enabling data packets to be sent to one or more destinations external to the data processing device, wherein the at least one exchange circuit is configured to send a first message to a first processor of the plurality of processors to grant permission to the first processor of the plurality of processors to send a first set of data packets over the at least one external interface, wherein the first processor is configured to, in response to receipt of the first message: transmit the first set of data packets to one of the destinations external to the data processing device; and transmit to the at least one exchange circuit, an identifier of a second processor of the plurality of processors, wherein the at least one exchange circuit is configured to, in response to receipt of the identifier of the second processor, send a second message to the second processor to grant permission to the second processor to send a second set of data packets over the at least one external interface.

Therefore, according to embodiments of the application, at least one exchange circuit is provided for co-ordinating the sending of data to external destinations by a set of processors. An exchange circuit grants permission to processors in turn, with each processor configured to provide an indication of the next processor in a sequence that is to be granted permission to send its data. This provides a great deal of flexibility for co-ordinating data transfer, since a processor that has permission to send data may specify any of the processors in the set to which it belongs for subsequently sending data. Hence, any pattern may be implemented for the order of processor sends. In some embodiments, the pattern may be determined dynamically at runtime, for example, in dependence upon branches in the code executed by the processors.

In some embodiments, the transmitting the identifier of the second processor comprises transmitting the second message to the at least one exchange circuit.

In some embodiments, at least some processors of the plurality of processors are configured to perform calculations on data to generate results during a compute phase, and to send data over the at least one external interface during an external exchange phase, wherein the compute phase is separated from the external exchange phase by a barrier synchronisation.

In some embodiments, for the external exchange phase, a processor of the plurality of processors is designated as the master processor for the external exchange phase, wherein the master processor is configured to: transmit to the at least one exchange circuit, an identifier of one of the plurality of processors that is scheduled to transmit data over the at least one external interface during the external exchange phase, prior to transmission of data by any others of the plurality of processors during the external exchange phase.

In some embodiments, for the external exchange phase, the second processor is a last processor scheduled to send data during the external exchange phase, wherein the second processor is configured to: after sending a final data packet to be sent over the at least one external interface by the plurality of processors during the external exchange phase, transmit to the at least one exchange circuit, a null processor identifier, marking an end of transmission by the plurality of processors for the external exchange phase.

In some embodiments, wherein the at least one exchange circuit is configured to: receive a first subset of the second set of data packets from the second processor at a buffer; monitor utilisation of the buffer; and in response to determining that the buffer utilisation has reached or exceeded a threshold, transmit a first flow control data packet to the second processor to cause the second processor to pause sending data.

In some embodiments, the at least one exchange circuit is configured to: in response to determining that the buffer utilisation has fallen below a threshold, transmit a second flow control data packet to the second processor to cause the second processor to resume sending the second set of data packets.

In some embodiments, wherein the second processor comprises a storage storing a first indication, indicating whether or not the second processor has exclusive permission amongst the plurality of processors to transmit data, wherein the second processor is configured to: in response to receipt of the second message, set the first indication to indicate that the second processor has exclusive permission to transmit data; and following the sending the second set of data packets over the at least one external interface, set the indication to indicate that the second processor does not have exclusive permission to transmit data.

In some embodiments, the storage of the second processor is configured to store a second indication, indicating whether or not the second processor is prevented from sending data due to flow control.

In some embodiments, the second processor is configured to: in response to receipt of the first flow control data packet, set the second indication to indicate that the second processor is prevented from sending data.

In some embodiments, the second processor is configured to: in response to receipt of the second flow control data packet, set the second indication to indicate that the second processor is permitted to send data; and resume sending the second set of data packets in response to determining that the first indication and the second indication are set to indicate that the second processor is permitted to send data.

In some embodiments, each processor of the plurality of processors is configured to run a compiled code sequence allocated to that processor.

In some embodiments, the compiled code sequence allocated to the first processor includes the identifier of the second processor.

In some embodiments, for each of least some of the processors of the plurality of processors: the compiled code sequence allocated to the respective processor includes an identifier of a respective next processor of the plurality of processors to which data is to be transmitted; and the respective processor is configured to: transmit data externally to the data processing device; and following the transmission of data externally to the data processing device, transmit the identifier of the respective next processor to the at least one exchange circuit.

In some embodiments, the at least one exchange circuit comprises: a multiplexer having a plurality of inputs, each of the inputs being connected to a different processor of the plurality of processors, the multiplexer having a single output for outputting data to be sent over the external interface; and processing circuitry configured to: receive the identifier of the second processor from the first processor; and in response to the identifier of the second processor, control the multiplexer to select one of the inputs connected to the second processor.

In some embodiments, the data processing device comprises: a plurality of sets of processors, each of the sets of processors comprising two or more processors, wherein the plurality of processors is a first set of the plurality of sets of processors; and a plurality of exchange circuits, each exchange circuit associated with one or more of the sets of processors, the plurality of exchange circuits including the at least one exchange circuit, wherein each of the plurality of exchange circuits is configured to pass permission for transmitting data externally to the data processing device between processors of its associated set of processors in dependence upon next processor identifiers received from processors currently having permission to send data.

In some embodiments, the first set of data packets are read requests for reading data from an external storage, wherein the first processor of the plurality of processors is configured to distribute at least some of the data read from the external storage by the read requests to other ones of the plurality of processors.

In some embodiments, the first set of data packets are write requests for writing data to an external storage, wherein the first processor of the plurality of processors is configured to, prior to issuing the write requests, receive data to be issued in the write requests from other ones of the plurality of processors.

According to a second aspect, there is provided a method for controlling the sending of data by a plurality of processors belonging to a device, the method comprising: sending a first message to a first processor of the plurality of processors to grant permission to the first processor of the plurality of processors to send a first set of data packets over at least one external interface of the device; receiving from the first processor, an identifier of a second processor of the plurality of processors; in response to receipt of the identifier of the second processor, send a second message to the second processor to grant permission to the second processor to send a second set of data packets over the at least one external interface.

In some embodiments, the method further comprises: following the sending of the first message, receiving the first set of data packets and forwarding the first set of data packets over an interconnect to be sent over the at least one external interface; and following the sending of the second message, receiving the second set of data packets and forwarding the second set of data packets over the interconnect to be sent over the at least one external interface.

According to a third aspect, there is provided a computer program comprising computer readable instructions, which when executed by at least one processor causes a method for controlling the sending of data by a plurality of processors belonging to a device to be performed, the method comprising: sending a first message to a first processor of the plurality of processors to grant permission to the first processor of the plurality of processors to send a first set of data packets over at least one external interface of the device; receiving from the first processor, an identifier of a second processor of the plurality of processors; in response to receipt of the identifier of the second processor, send a second message to the second processor to grant permission to the second processor to send a second set of data packets over the at least one external interface.

In some embodiments, the method further comprises: following the sending of the first message, receiving the first set of data packets and forwarding the first set of data packets over an interconnect to be sent over the at least one external interface; and following the sending of the second message, receiving the second set of data packets and forwarding the second set of data packets over the interconnect to be sent over the at least one external interface.

According to a fourth aspect, there is provided a non-transitory computer readable medium for storing the computer program according to the third aspect.

BRIEF DESCRIPTION OF DRAWINGS

To aid understanding of the present disclosure and to show how embodiments may be put into effect, reference is made by way of example to the accompanying drawings in which.

DETAILED DESCRIPTION

Figure 1:
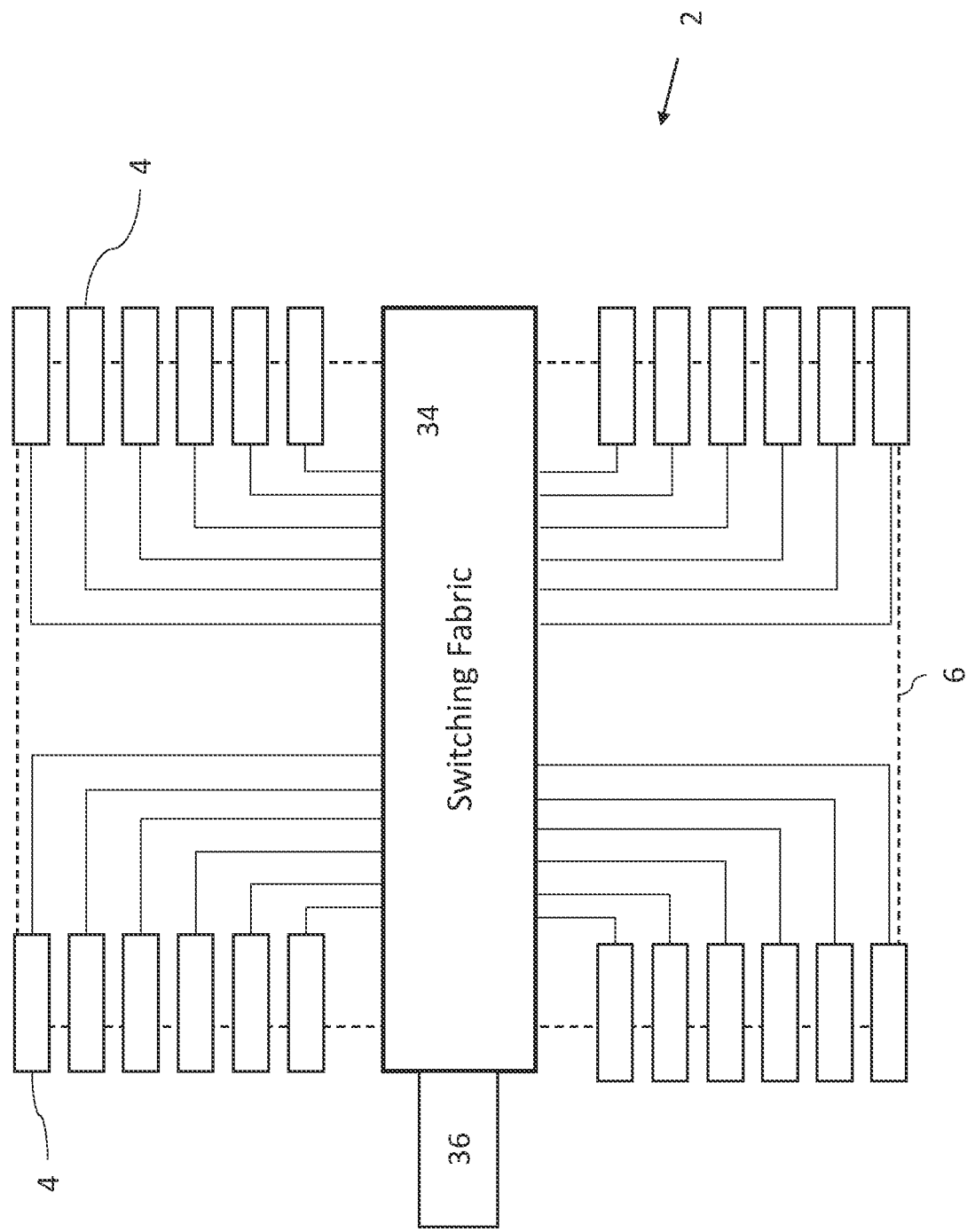
FIG. 1 is a schematic block diagram of a multi-tile processing unit.

Reference is made to FIG. 1, which illustrates an example processing unit 2. This example processing unit 2 is a multi-tile processing unit 2. The processing unit 2 may be an Intelligence Processing Unit (IPU) that is described in our earlier U.S. application Ser. No: 15/886,065, the contents of which are incorporated by reference. Each of the IPUs is formed on a separate integrated circuit (i.e. a chip).

The processing unit 2 comprises an array 6 of multiple processor tiles 4 and an interconnect 34 connecting between the tiles 4. The processing unit 2 may be implemented alone as one of multiple dies packaged in the same IC package. The interconnect 34 may also be referred to herein as the "exchange fabric" 34 as it enables the tiles 4 to exchange data with one another. Each tile 4 comprises a respective instance of an execution unit and memory. For instance, by way of illustration, the processing unit 2 may comprise of the order of hundreds of tiles 4, or even over a thousand. For completeness, note also that an "array" as referred to herein does not necessarily imply any particular number of dimensions or physical layout of the tiles 4.

In embodiments, each processing unit 2 is part of a chip that also comprises one or more external links 8, enabling the processing unit 2 to be connected to one or more other processing units (e.g. one or more other instances of the same processing unit 2). These external links 8 may comprise any one or more of: one or more processing unit-to-host links for connecting the processing unit 2 to a host system, and/or one or more processing unit-to-processing unit links for connecting together with one or more other instances of the processing unit 2 on the same IC package or card, or on different cards. The processing unit 2 receives work from the host, in the form of application data which it processes.

Figure 2:
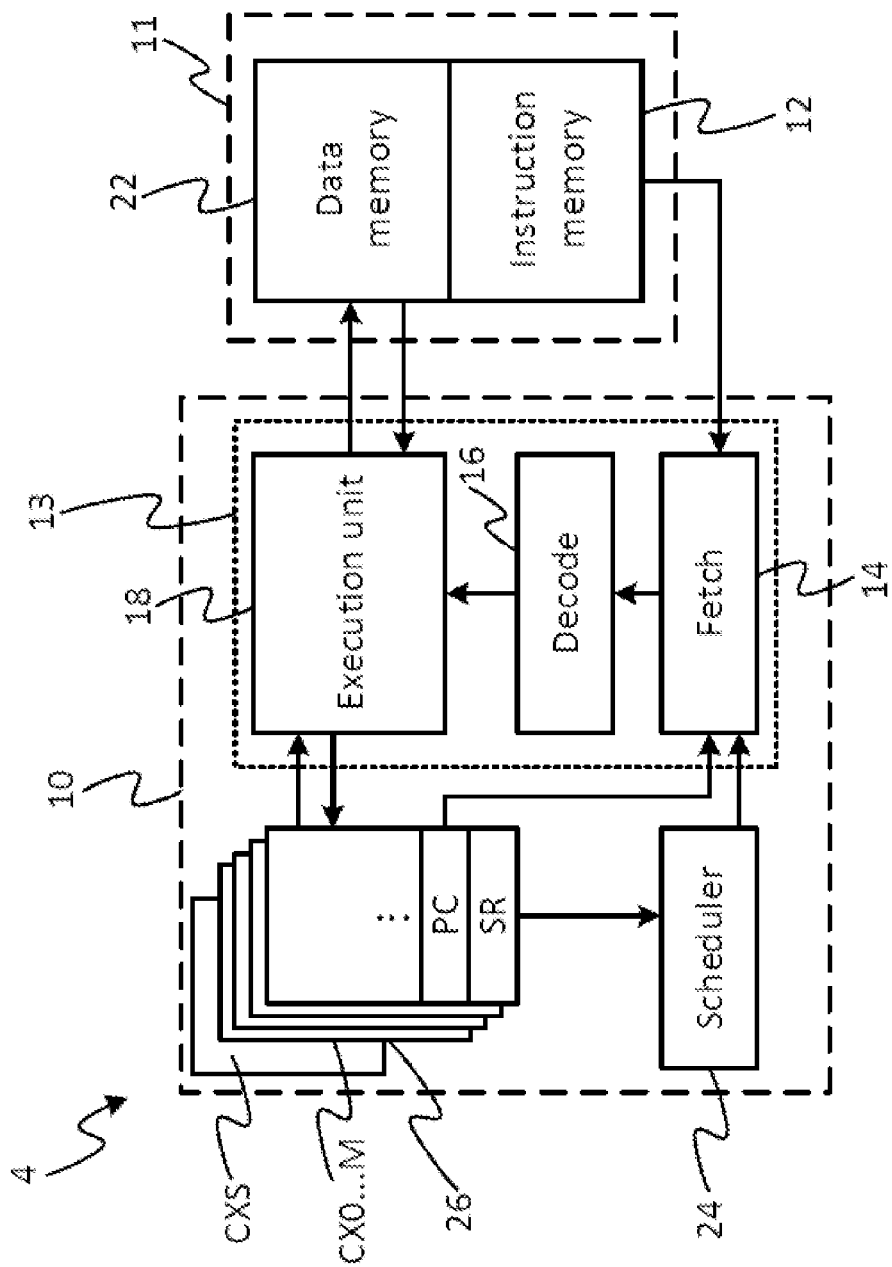
FIG. 2 is a schematic block diagram of one of the tiles that may be implemented in the multi-tile processing unit.

Each of the processor tiles 4 comprises processing circuitry and memory. In some example embodiments, the processing circuitry is a multi-threaded processor 10. FIG. 2 illustrates an example of a processor tile 4 in accordance with embodiments of the present disclosure. The processor tile 4 comprises a multi-threaded processor 10 in the form of a barrel-threaded processor 10, and a local memory 11 (i.e. on the same tile in the case of a multi-tile array, or same chip in the case of a single-processor chip). A barrel-threaded processor 10 is a type of multi-threaded processor 10 in which the execution time of the pipeline is divided into a repeating sequence of interleaved time slots, each of which can be owned by a given thread. This will be discussed in more detail shortly. The memory 11 comprises an instruction memory 12 and a data memory 22 (which may be implemented in different addressable memory unit or different regions of the same addressable memory unit). The instruction memory 12 stores machine code to be executed by the processing unit 10, whilst the data memory 22 stores both data to be operated on by the executed code and data output by the executed code (e.g. as a result of such operations).

The memory 12 stores a variety of different threads of a program, each thread comprising a respective sequence of instructions for performing a certain task or tasks. Note that an instruction as referred to herein means a machine code instruction, i.e. an instance of one of the fundamental instructions of the processor's instruction set, consisting of a single opcode and zero or more operands.

Within the processor 10, multiple different ones of the threads from the instruction memory 12 can be interleaved through a single execution pipeline 13 (though typically only a subset of the total threads stored in the instruction memory can be interleaved at any given point in the overall program). The multi-threaded processor 10 comprises: a plurality of context register files 26 each arranged to represent the state (context) of a different respective one of the threads to be executed concurrently; a shared execution pipeline 13 that is common to the concurrently executed threads; and a scheduler 24 for scheduling the concurrent threads for execution through the shared pipeline in an interleaved manner, preferably in a round robin manner. The processor 10 is connected to a shared instruction memory 12 common to the plurality of threads, and a shared data memory 22 that is again common to the plurality of threads.

The execution pipeline 13 comprises a fetch stage 14, a decode stage 16, and an execution stage 18 comprising an execution unit which may perform arithmetic and logical operations, address calculations, load and store operations, and other operations, as defined by the instruction set architecture. Each of the context register files 26 comprises a respective set of registers for representing the program state of a respective thread.

Referring back to FIG. 1, the interconnect 34 is configured to enable the different tiles 4 in the array 6 to communicate with one another. However, as well as there potentially being dependencies between threads on the same tile 4, there may also exist dependencies between the portions of the program running on different tiles 4 in the array 6. A technique is therefore required to prevent a piece of code on one tile 4 running ahead of data upon which it is dependent being made available by another piece of code on another tile 4. This is achieved using a data consistency model.

Parallel programming models for AI and Data Science usually follows a 3-phase iterative execution model: Compute, Barrier, and Exchange. The implications are that data transfer to and from a processor is usually barrier dependent to provide data-consistency between the processors and between each processor and an external storage. Typically used data consistency models are Bulk Synchronous Parallel (BSP), Stale Synchronous Parallel (SSP) and Asynchronous. The processing unit 2 described herein uses a BSP model, but it will be apparent that the other sync models could be utilised as an alternative.

Figure 3:
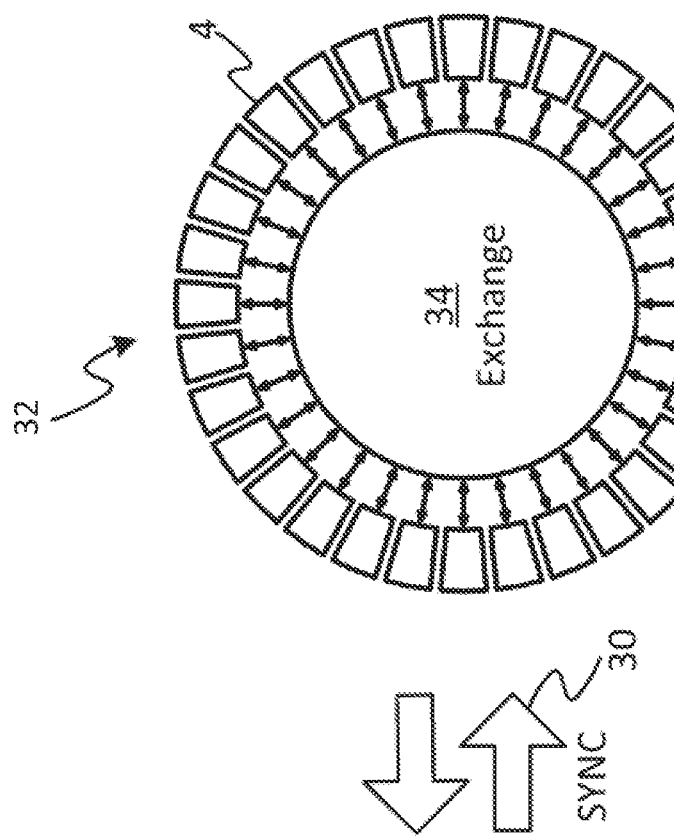
FIG. 3 illustrates the compute and exchange phases between which tiles in the processing unit may alternate.
Figure 3:
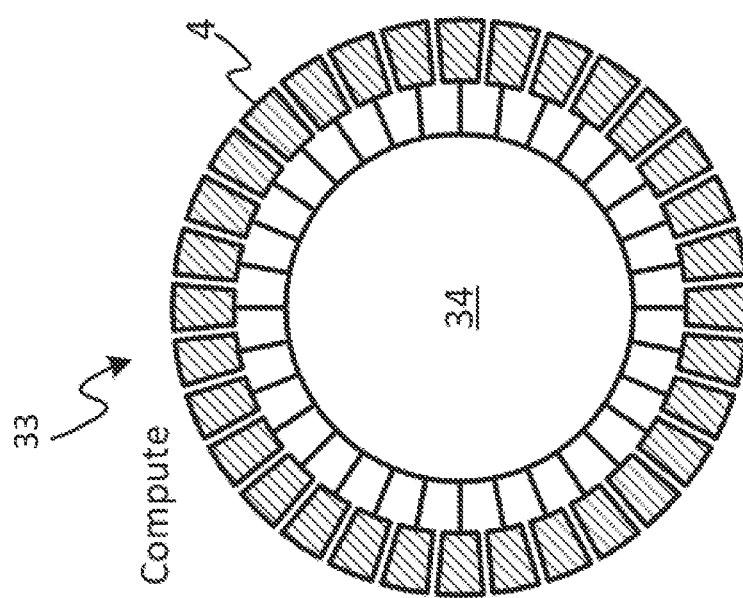
Figure 4:
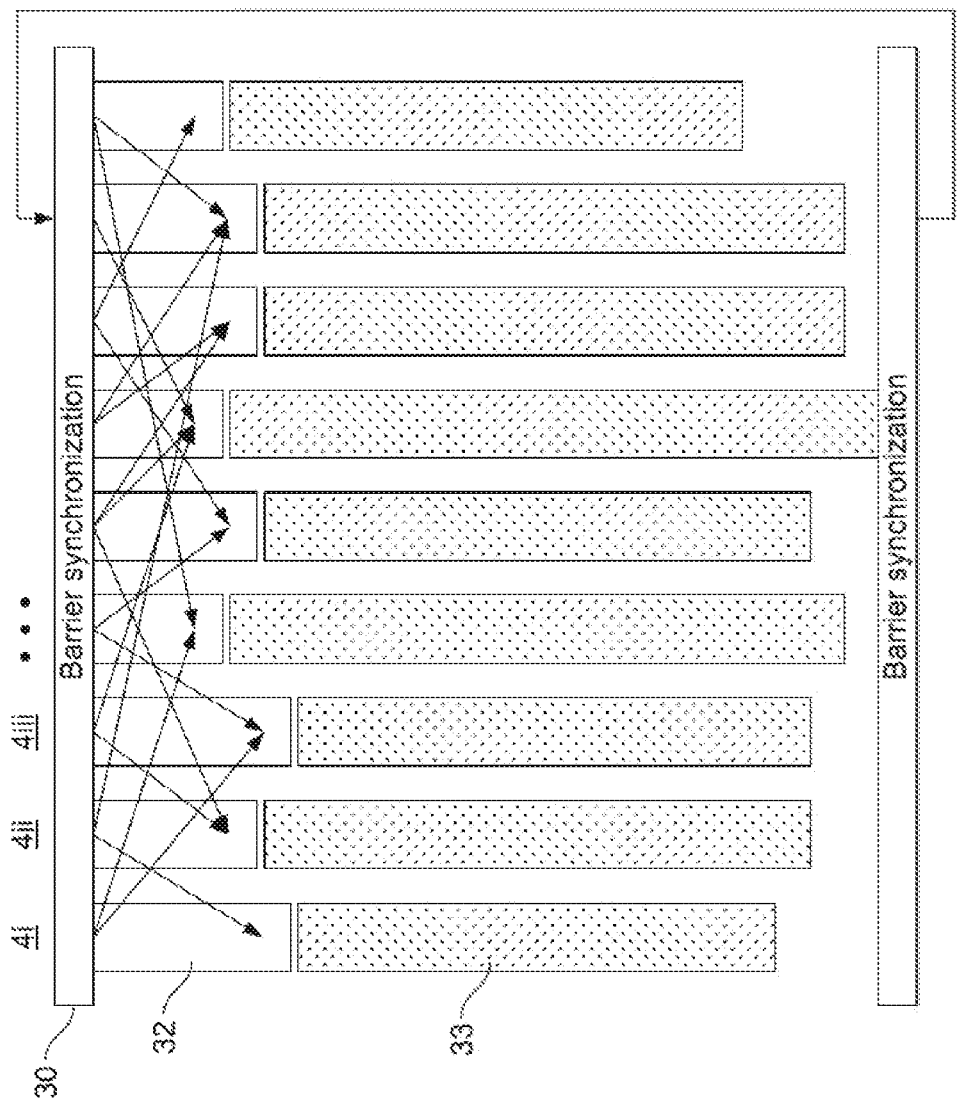
FIG. 4 is a schematic illustration of a bulk synchronous parallel (BSP) computing model.

Reference is made to FIGS. 3 and 4, which illustrate an implementation of a BSP exchange scheme in which each tile 4 performs a compute phase 33 and an exchange phase 32 in an alternating cycle, separated from one to the other by a barrier synchronization 30 between tiles. In the case illustrated by FIGS. 2 and 3, a barrier synchronization is placed between each compute phase 33 and the following exchange phase 32. During the compute phase 33, each tile 4 performs one or more computation tasks locally on-tile, but does not communicate any results of these computations with any others of the tiles 4. In the exchange phase 32, each tile 4 is allowed to exchange one or more results of the computations from the preceding compute phase to and/or from one or more others of the tiles 4, but does not perform any new computations until it has received from other tiles 4 any data on which its task(s) has/have dependency. Neither does it send to any other tile 4, any data except that computed in the preceding compute phase. It is not excluded that other operations such as internal control-related operations may be performed in the exchange phase 32. The communication external to the tile group may optionally utilise the BSP mechanism, but alternatively may not utilize BSP and may instead use some other synchronization mechanism of its own.

According to the BSP principle, a barrier synchronization 30 is placed at the juncture transitioning from the compute phase 33 into the exchange phase 32, or the juncture transitioning from the exchange phase 32 into the compute phase 33, or both. That is to say, either: (a) all tiles 4 are required to complete their respective compute phases 33 before any in the group is allowed to proceed to the next exchange phase 32, or (b) all tiles 4 in the group are required to complete their respective exchange phases 32 before any tile in the group is allowed to proceed to the next compute phase 33, or (c) both of these conditions are enforced. In all three variants, it is the individual tiles which alternate between phases, and the whole assembly which synchronizes. The sequence of exchange and compute phases may then repeat over multiple repetitions. In BSP terminology, each repetition of exchange phase and compute phase is sometimes referred to as a "superstep" (though note that in the literature the terminology is not always used consistently: sometimes each individual exchange phase and compute phase individually is called a superstep, whereas elsewhere, as in the terminology adopted herein, the exchange and compute phases together are referred to as a superstep).

Note also, it is not excluded that multiple different independent groups of tiles 4 on the same processing unit 2 or different processing units 2 could each form a separate respective BSP group operating asynchronously with respect to one another, with the BSP cycle of compute, synchronize and exchange being imposed only within each given group, but each group doing so independently of the other groups. I.e. a multi-tile array 6 might include multiple internally synchronous groups each operating independently and asynchronously to the other such groups (discussed in more detail later). In some embodiments there is a hierarchical grouping of sync and exchange, as will be discussed in more detail later.

FIG. 4 illustrates the BSP principle as implemented amongst a group 4i, 4ii, 4iii of some or all of the tiles in the array 6, in the case which imposes: (a) a barrier synchronization from compute phase 33 to exchange phase 32 (see above). Note that, in this arrangement, some tiles 4 are allowed to begin computing 33 whilst some others are still exchanging.

The BSP model is used for exchange of data between tiles 4 on the processing unit 2. The communication between tiles 4 of a processing unit 2 occurs in time deterministic fashion in which data packets are transmitted without headers as in our earlier application U.S. patent application Ser. No: 15/886,315. Additionally, the BSP model may also be used for the exchange of data between processing units 2. Such an exchange of data between processing units 2 is referred to as an external exchange 50'.

Figure 5:
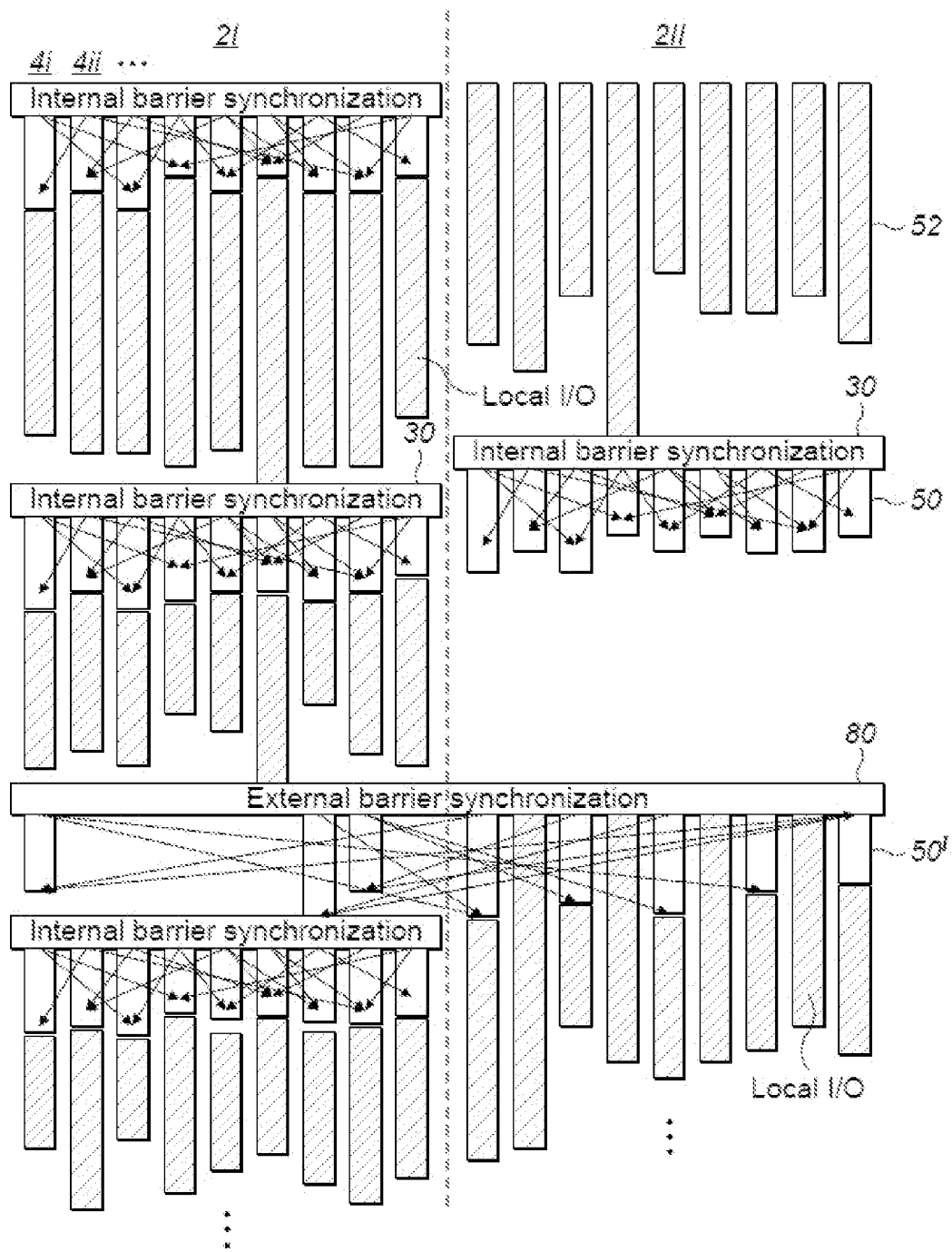
FIG. 5 illustrates a bulk synchronous parallel (BSP) computing model.

Reference is made to FIG. 5 illustrates an example BSP program flow involving both internal (on-chip) and external (inter-chip) synchronizations. As shown, the flow comprises internal exchanges 50 (of data between tiles 4 on the same chip 2) and an external exchange 50' (of data between tiles 4 on different chips 2). The program flow in FIG. 5 illustrates a program flow for a first processing unit 2i and a second processing unit 2ii.

As illustrated in FIG. 5, the internal BSP supersteps (comprising the internal exchanges 50 of data between tiles 4 on the same chip 2) are kept separate from the external sync and exchange (comprising the external exchanges 50' of data between tiles 4 on different chips 2).

The program may be arranged to perform a sequence of synchronizations, exchange phases and compute phases comprising, in the following order: (i) a first compute phase, then (ii) an internal barrier synchronization 30, then (iii) an internal exchange phase 50, then (iv) an external barrier synchronization 80, then (v) an external exchange phase 50'. The external barrier 80 is imposed after the internal exchange phase 50, such that the program only proceeds to the external exchange 50' after the internal exchange 50. Note also that, as shown with respect to chip 2*l* in FIG. 5, optionally a compute phase may be included between internal exchange (iii) and external barrier (iv).

This overall sequence is enforced by the program (e.g. being generated as such by the compiler). In embodiments, the program is programmed to act in this way by means of a SYNC instruction executed by the tiles 4. The internal synchronization and exchange does not extend to any tiles or other entities on another chip 2. The sequence (i)-(v) (with the aforementioned optional compute phase between iii and iv) may be repeated in a series of overall iterations. Per iteration there may be multiple instances of the internal compute, sync and exchange (i)-(iii) prior to the external sync & exchange. I.e. multiple instances of (i)-(iii) (retaining that order), i.e. multiple internal BSP supersteps, may be implemented before (iv)-(v), i.e. the external sync and exchange. Note also, any of the tiles 4 may each be performing their own instance of the internal synchronization and exchange (ii)-(iii) in parallel with the other tiles 4.

Thus per overall BSP cycle (i)-(v) there is at least one part of the cycle (ii)-(iii) wherein synchronization is constrained to being performed only internally, i.e. only on-chip.

Note that during an external exchange 50 the communications are not limited to being only external: some tiles may just perform internal exchanges, some may only perform external exchanges, and some may perform a mix.

Also, as shown in FIG. 5, some tiles 4 may perform local input/output during a compute phase. For example, they may exchange data with a host or other type of external storage.

Note also that, as shown in FIG. 5, it is in general possible for any or all tiles to have a null compute phase 52 or a null exchange phase 50 in any given BSP superstep.

Each of the barrier synchronisation shown in FIG. 5 is passed by the tiles 4 once an exchange of transmission of sync requests and acknowledgments has completed. For an internal barrier synchronisation, each tile 4 in a processing unit 2, once it reaches an internal barrier synchronisation, sends an internal sync request to the internal synchronisation controller 36 in the interconnect 34. When the internal synchronisation controller 36 has received sync requests from all of the tiles 4 that are part of the processing unit 2, the sync controller 36 returns sync acknowledgments to each of the tiles 4. Upon receiving the sync acknowledgments, each of the tiles 4 then enters the exchange phase in which data exchange between the tiles 4 occurs. This technique ensures the each tile 4 must reach the barrier before any of the tiles can progress to the exchange phase.

For an external barrier synchronisation, the exchange of sync requests and acknowledgments takes place between a group of processing units 2, referred to as a synchronisation group. Following the exchange of sync requests and acknowledgments, the processing units 2 exchange data during an exchange phase.

Each of the tiles 4 on the processing unit 2, once it reaches the external barrier synchronisation, issues an external sync request to external sync logic (not shown in FIG. 1) that is associated with the processing unit 2. Once the external sync logic has received a sync request from all of the tiles 4 on the processing unit 2, it either acknowledges those sync requests or propagates a sync request to a further entity that is part of the sync group. The further entity could be a proxy for exchanging data with a host system or external sync logic associated with another processing unit 2.

When a sync request is propagated to another processing unit 2, the action taken by the external sync logic in that other processing unit 2 in response to the sync request depends upon whether the logic is defined as the master for the sync group or as a propagation node for that group. The propagation nodes propagate their received sync requests towards the master defined for the sync group. The sync master, once it has received external sync requests for each of the processing units 2 that are part of the sync group, returns sync acknowledgments to the external sync logic associated with each of the other processing units 2 in the sync group. The sync master also returns sync acknowledgments to each of the tiles 4 in its own processing unit 2. Each external sync logic (i.e. the propagation nodes) of the other processing unit 2 in the sync group, upon receiving a sync acknowledgment, returns sync acknowledgments to the tiles 4 of its processing unit 2. In response to receiving the sync acknowledgements, the tiles 4 pass the barrier synchronisation and exchange data with the other processing units 2 of the sync group during the exchange phase.

Figure 6A:
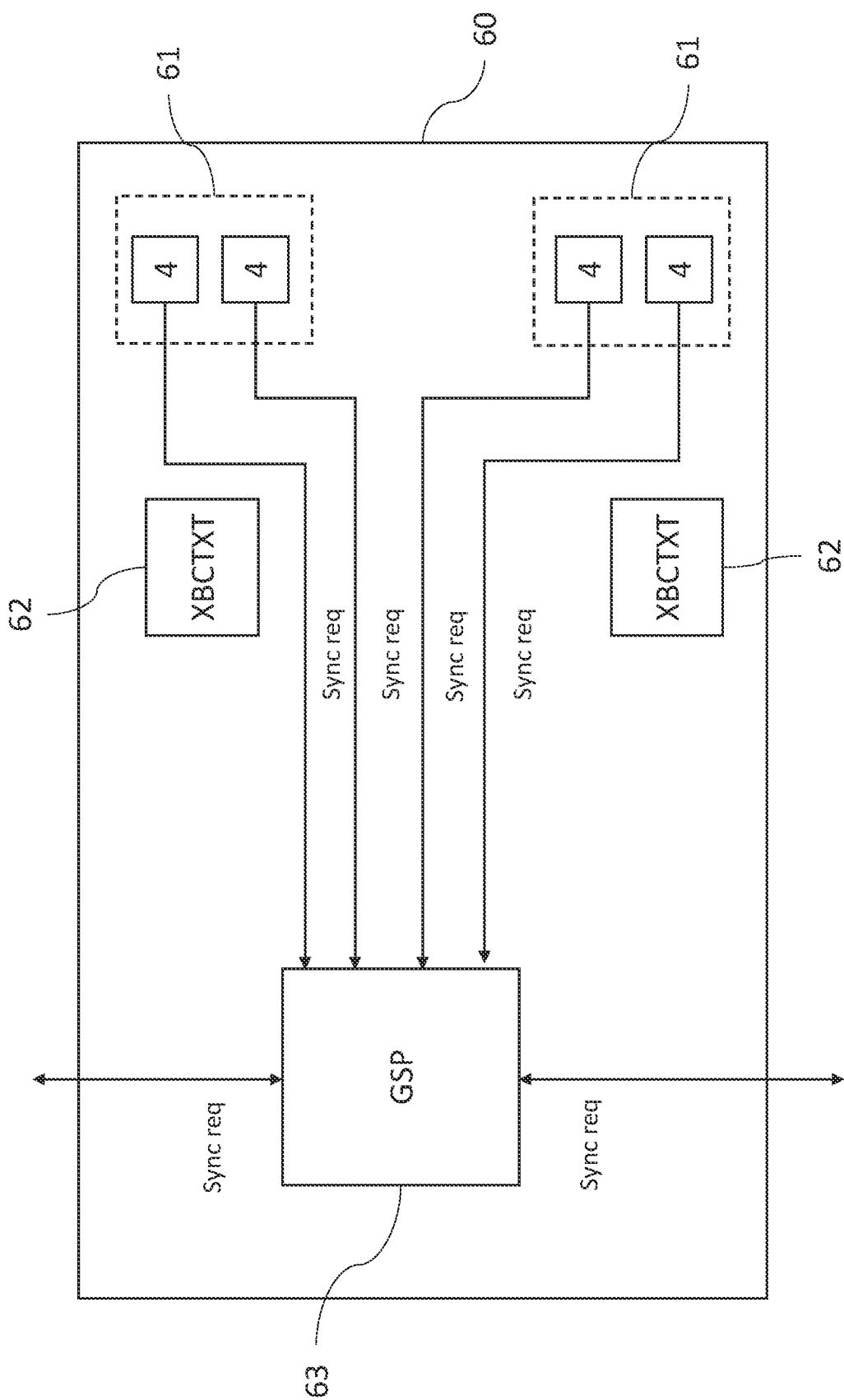
FIG. 6A illustrates the exchange of sync requests for co-ordinating a barrier synchronisation.
Figure 6B:
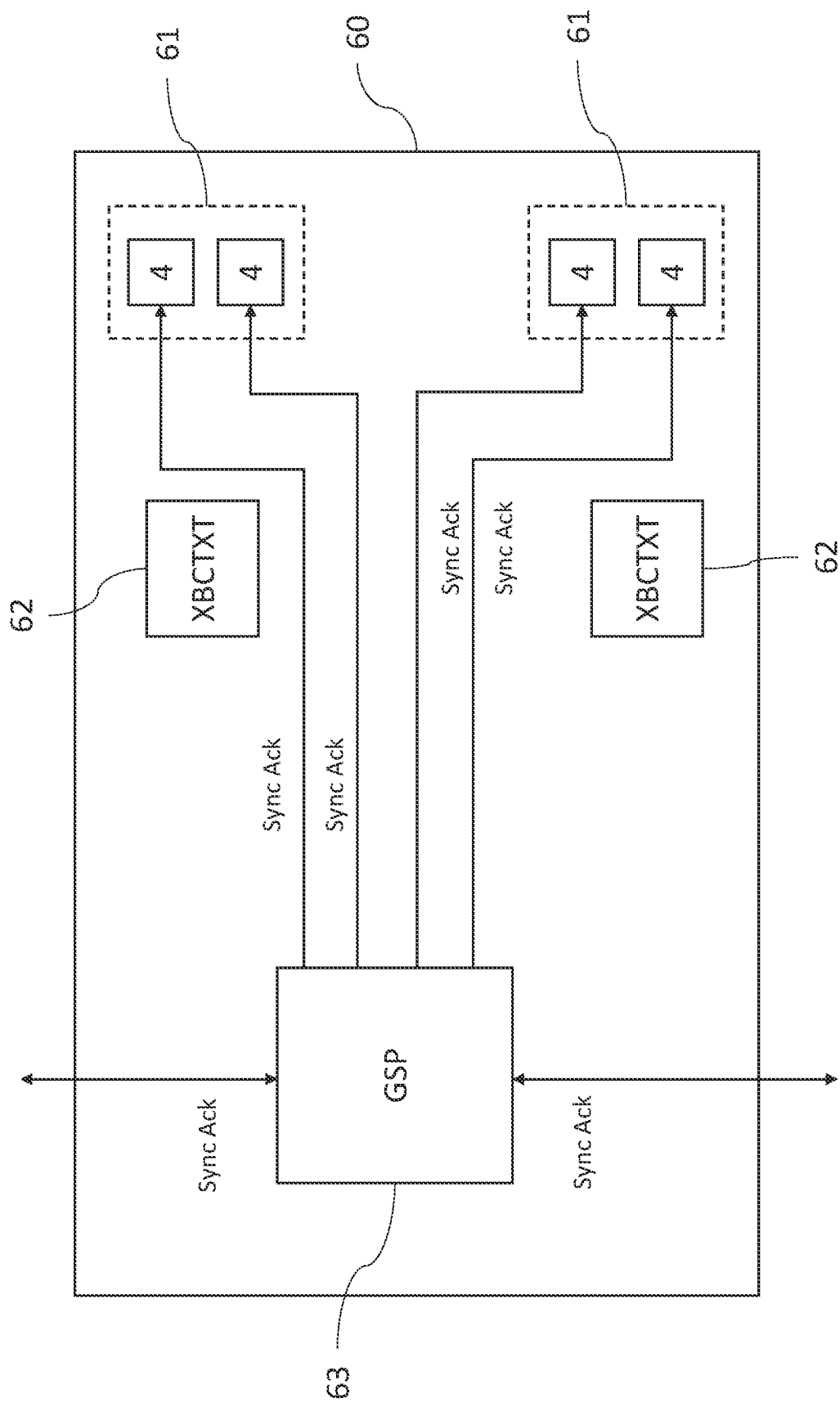
FIG. 6B illustrates the exchange of sync acknowledgments for co-ordinating a barrier synchronisation.

Reference is made to FIGS. 6A and 6B, which illustrate the exchange of sync requests and acknowledgements, performed in order to co-ordinate an external barrier synchronisation.

The tiles 4 of the processing unit 2 belong to a device 60. In embodiments, this device 60 is an integrated circuit (i.e. a chip).

The tiles 4 are shown divided into different subsets 61. Each subset 61 is associated with a different module 62, referred to herein as an exchange block context 62. The nature of the exchange block context 62 will be described in more detail later. For simplification, only two subsets of tiles 4 and two exchange block contexts 62 are shown in FIGS. 6A and 6B. However, in embodiments, the device 60 may include sixty-four subsets 61 of tiles 4 and sixty-four exchange block contexts 62. Each subset 61 of tiles 4 may include forty-eight tiles 4.

Also shown in FIGS. 6A and 6B is the external sync logic 63. The external sync logic 63 may be referred to as the global sync peripheral (GSP).

As shown in FIG. 6A, when each tile 4 in the sync group reaches an external barrier sync, it executes a sync instruction, which causes it to issue a sync request to the GSP 63. The action taken by the GSP 63, after having received all of the sync requests from the tiles 4 of the device 60 that belong to the relevant sync group defined for the sync, depends upon whether the GSP 63 is defined as the master node for the sync group or the propagation node for the sync group. If the GSP 63 is the master node, the GSP 63 waits until it receives all of the expected sync requests from the downstream nodes in the sync network before transmitting sync acknowledgments. If the GSP 63 is the sync propagation node, after having received the sync requests from all of the tiles 4 on the device 60 belonging to the sync group, the GSP 63 transmits one or more sync requests upstream towards the master node. The downstream nodes and/or master nodes may be the GSPs on other multi-processor devices.

As shown in FIG. 6B, the GSP 63 transmits sync acknowledgments to all of the tiles 4 in the sync group. If the GSP 63 is defined as the master node, it transmits the sync acknowledgments after receiving sync requests from all downstream nodes. The master GSP 63, in this case, sends sync acknowledgments to other nodes (e.g. other GSPs) external to the device 60 as well to tiles 4 on device 60. If the GSP 63 is defined as a propagation node, it transmits sync acknowledgments to the tiles 4 on device 60 in response to receipt of a sync acknowledgment sent from an upstream node.

In response to receipt of a sync acknowledgment, each tile 4 of the sync group enters the exchange phase. In this exchange phase, the participating tiles 4 may each send one or more data packets to destinations external to the device 60 and/or may receive one or more data packets from destinations external to the device 60.

During an external exchange phase, each exchange block context 62 is operable to co-ordinate the sending of data by its associated set 61 of tiles 4. Each such exchange block context 62 is configured to co-ordinate the sending of data by its associated set 61 of tiles 4 such that only one tile 4 of its associated set 61 of tiles 4 is configured to send data at any one time. When a tile 4 is granted permission to send data by its associated exchange block context 62, it transmits one or more data packets to its associated exchange block context 62. Those data packets are output by the exchange block context 62 onto an interconnect of the device 60, 60a and are routed, based on addresses in their headers, to the appropriate interface of the device 60, 60a for sending to an external destination.

Figure 7A:
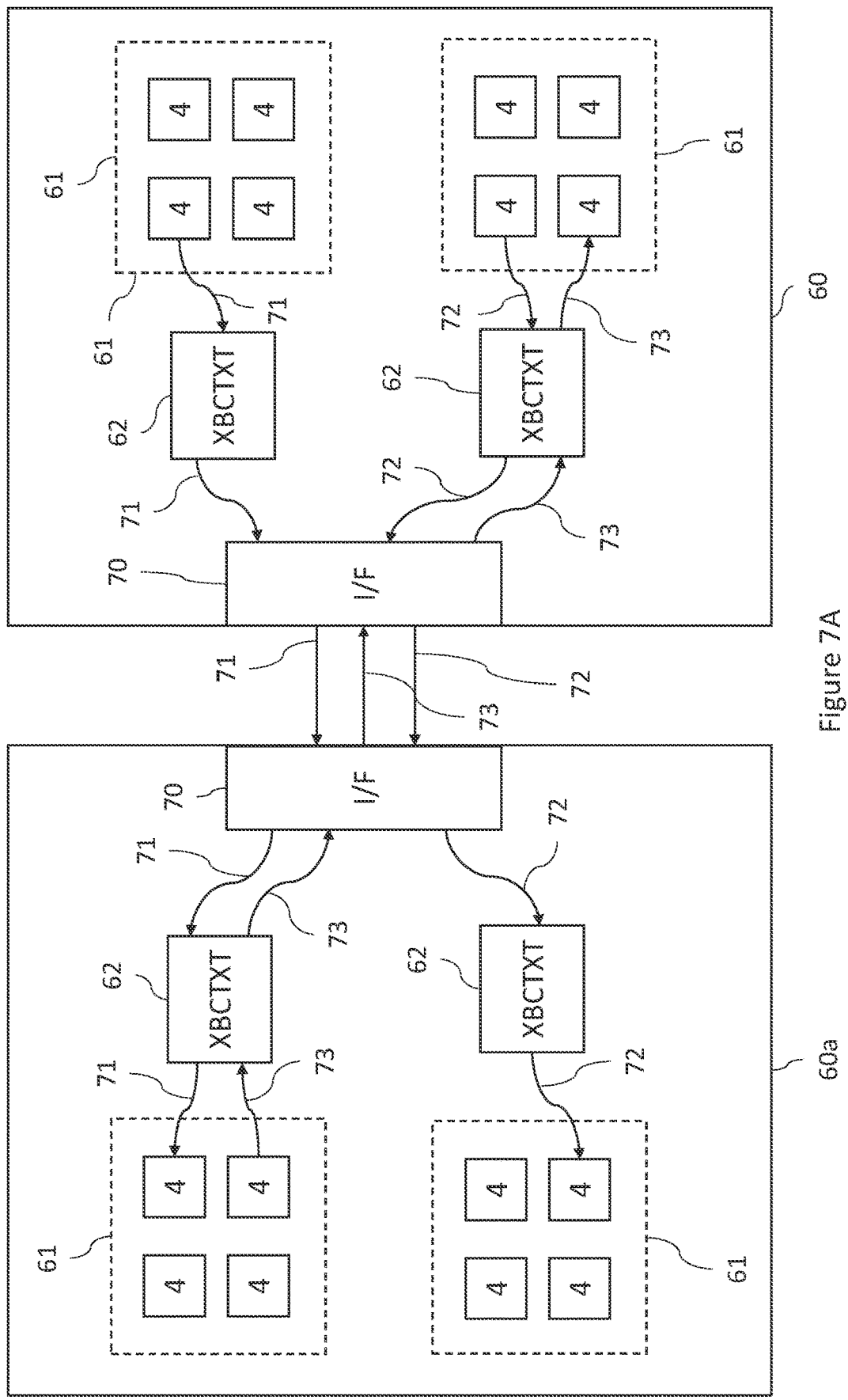
FIG. 7A illustrates an example of two data processing devices having multiple sets of processors for exchanging data between the devices.
Figure 7B:
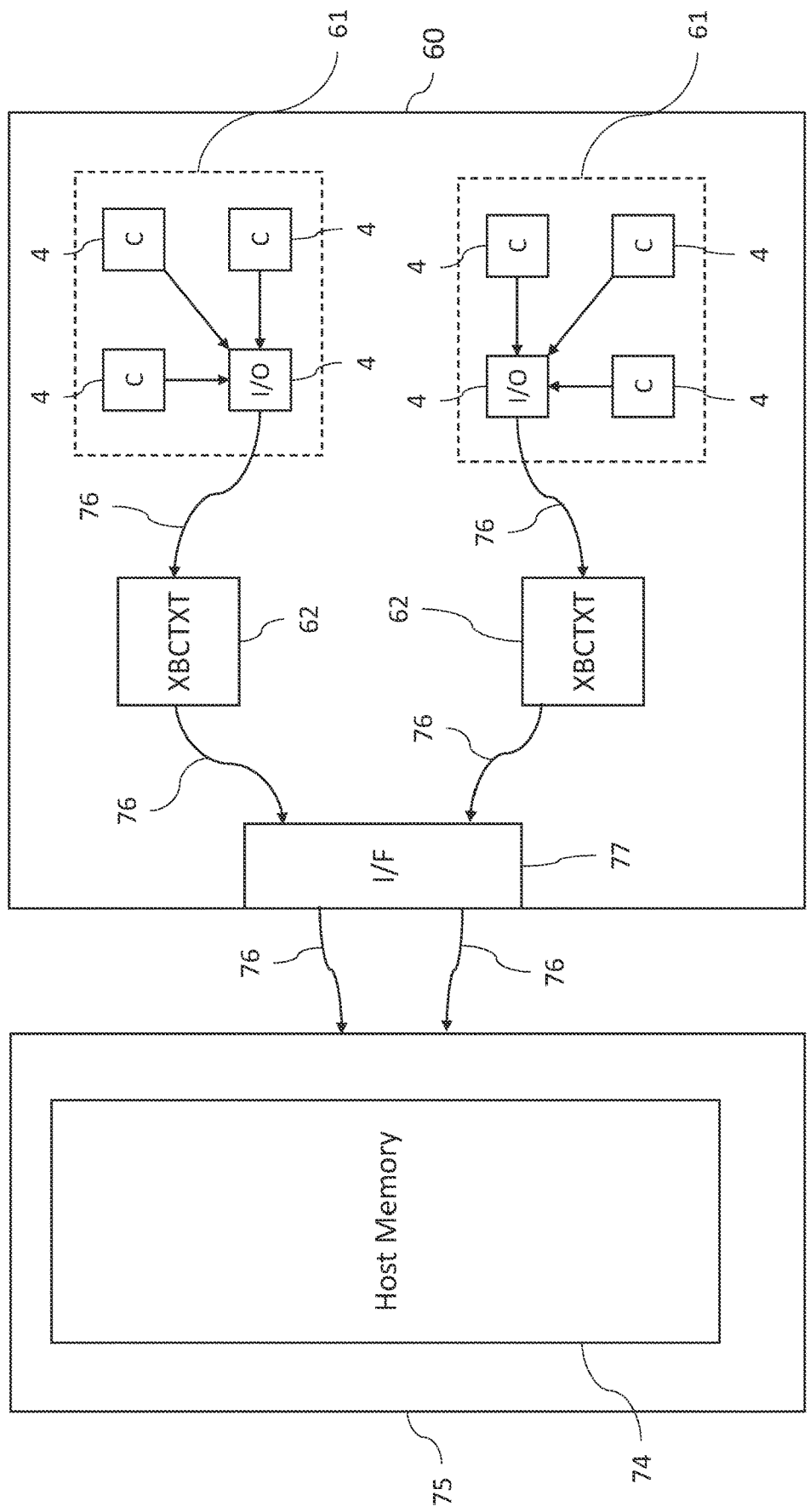
FIG. 7B illustrates an example of a data processing device having multiple sets of processors for writing data to a host device.
Figure 7C:
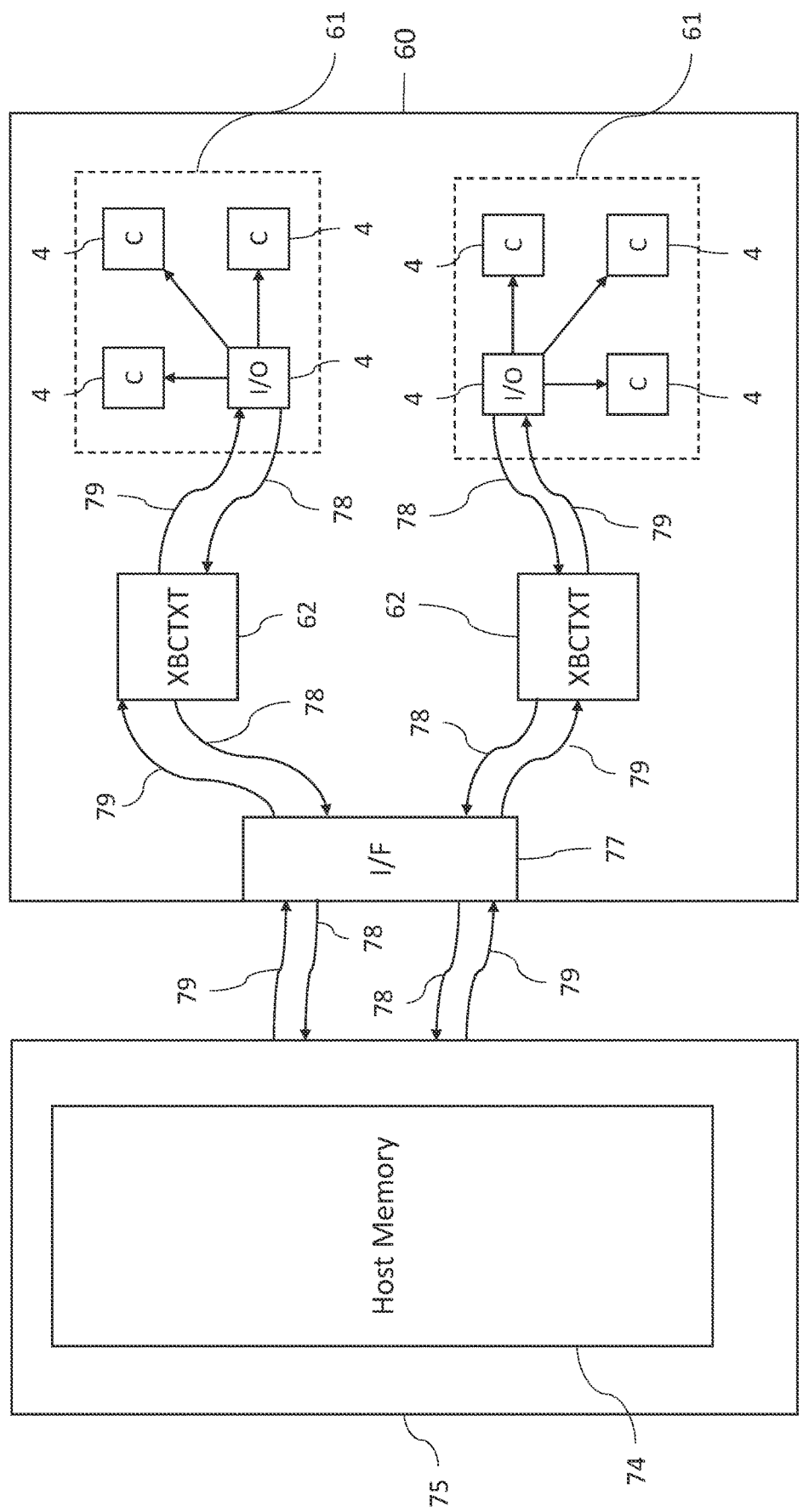
FIG. 7C illustrates an example of a data processing device having multiple sets of processors for reading data from a host device.

Examples will now described—with reference to FIGS. 7A, 7B, and 7C—of data exchange performed by the tiles 4 during external exchange phases.

Reference is made to FIG. 7A, which illustrates an example of how the tiles 4 may transmit data externally via their associated exchange block contexts 62. In this example, the data is exchanged between tiles 4 of device 60 and tiles 4 of device 60a. Device 60a may be identical to device 60.

Each device 60, 60a includes an external interface 70, via which tiles 4 of that device 60, 60a may send data to the other of the devices 60, 60a and receive data from the other of the device 60, 60a.

The one or more data packets sent by a tile 4 to another tile 4 on a different device take the form of write requests. FIG. 7A shows three example write requests 71, 72, 73. A first write request 71 is dispatched from a tile 4 on device 60. This first write request 71 is provided to that tile's 4 associated exchange block context 62, from where it is routed to the interface 70 of the device 60. The first write request 71 is provided to the interface 70 of the other device 60a over a network, e.g. a PCIe link or an Ethernet network, connecting the devices 60, 60a. The first write request 71 is routed over an interconnect of the device 60a to the exchange block context 62 that is associated with the tile 4 identified in the header of the write request 71 as being the destination for the write request 71. On the basis of this header, the exchange block context 62 provides the write request 71 to the destination tile 4.

A similar process is performed for the second write request 72, which is dispatched from another tile 4 on device 60. This write request 72 is routed to its destination tile 4 on device 60a in the same manner as discussed above for the first write request 71.

A third write request 73 is dispatched from a tile 4 on device 60a. The third request 73 is routed to a destination tile 4 on device 60. In the example in FIG. 7A, the third write request 73 is provided to a tile 4 belonging to the same set 61 as the tile 4 responsible for dispatching the second write request 72. In embodiments, although each exchange block context 62 limits the number of tiles 4 in its associated set 61 having permission to dispatch packets at any one time to one, other tiles 4 in the same set 61 may still receive packets whilst a different tile 4 in the set 61 has permission to send.

Reference is made to FIG. 7B, which illustrates how tiles 4 may write data to a host device 75 that is external to the device 60. FIG. 7B shows that the host device 75 includes a host memory 74 to which data may be written by the tiles 4.

The tiles 4 are shown in FIG. 7B as being divided into two different types. A first type of tile 4 is an I/O tile 4 (which is labelled with "I/O" in FIG. 7B). A second type of tile 4 is a compute tile (which is labelled with a "C" in FIG. 7B). The I/O tiles 4 are a specific set of tiles to which I/O is designated. These tiles 4 are responsible for transferring data to the host 75 in an external exchange phase, and for reading data from the host 75 during the external exchange phase. The I/O tiles 4 exchange data with the host 75 on behalf of the compute tiles 4 that are part of their set 61. Although in FIG. 7B only a single I/O tile 4 is shown as belonging to each of the sets 61 of tiles 4, in embodiments more than one I/O tile 4 may be allocated for use during an external exchange phase, with the condition imposed that only one of the I/O tiles 4 in a set 61 has permission to issue write or read requests to the host 75 at any one time. In particular, multiple I/O tiles 4 per set 61 may be allocated in the case that there is a large amount of data to exchange with the host 75 during a given external exchange phase, such that the memory capacity of a single I/O tile 4 would be exceeded. If there is more than one I/O tile 4 in a given set 62, during the external exchange phase, the exchange block context 62 passes permission to issue the write requests or read requests between its associated I/O tiles 4.

It would appreciated that, in at least some embodiments, there is no physical distinction between I/O tiles 4 and compute tiles 4, but each performs its function (i.e. operating as either an I/O tile 4 or a compute tile 4) during a given external exchange phase, in dependence upon the compiled code set allocated to it.

The compute tiles 4 do not send data to the host 75 during an external exchange phase. However, during an internal exchange phase prior to the external exchange phase, compute tiles 4 may send data to I/O tiles 4 that belong to the same set 61 as themselves. The compute tiles 4 send this data to their associated I/O tiles 4, such that the I/O tiles 4 store the data in their memory 11 to be available for sending to the host 75 during an upcoming external exchange phase.

The I/O tiles 4 may issue write requests 76 during the external exchange phase to write data to the memory 74 of the host 75. These write requests 76 are sent by the I/O tiles 4 to their associated exchange block context 62, which provides the write requests 76 to an interface 77 with the host 75. The write requests 76 are provided over the interface 77 to the host 75, which causes the data contained in the payloads of the write requests 76 to be written to host memory 74.

Reference is made to FIG. 7C, which illustrates how tiles 4 may read data from a source external to the device 60. In this example, the source is the host device 75 comprising the host memory 74. As in FIG. 7B, the tiles 4 are shown as being divided into I/O tiles 4 and compute tiles 4. The I/O tiles 4, in this case, are responsible for issuing read requests to read data from the host memory 74 during an external exchange phase. After having read this data, the I/O tiles 4 are then responsible for distributing the read data to the compute tiles 4 of their set 61 during an internal exchange phase.

As shown, the I/O tiles 4 issue read requests 78 during to read data from the memory 74 of the host 75. These read requests 78 are provided by the I/O tiles 4 to their associated exchange block context 62, which provides the read requests 78 to an interface 77 with the host 75. The read requests are provided over the interface 77 to the host 75, which causes data from the memory 74 to be returned in read completions 79 to the I/O tiles 4. Each read completion 79 is returned to the I/O tile 4 that issued the read request 78.

The I/O tiles 4 store the data that they receive in the read completions 79 during the external exchange phase. In a subsequent internal exchange phase, the I/O tiles 4 distribute the data to the compute tiles 4 belonging to their associated set 61 of tiles 4.

Although FIGS. 7B and 7C show the reading and writing of data with the host 75 as occurring separately, it would be appreciated that these two processes may be implemented together in a single exchange phase. That is, each I/O tile 4 may issue read requests and write requests during the same external exchange phase.

It will now be described how the control over which tile 4 in a set 61 of tiles 4 sends data externally at any one time is exercised. The data that is sent externally is described below as being sent in the form of data packets. These data packets may be write requests (e.g. write requests 71, 72, 76) or may be read requests (e.g. read requests 78).

Figure 8:
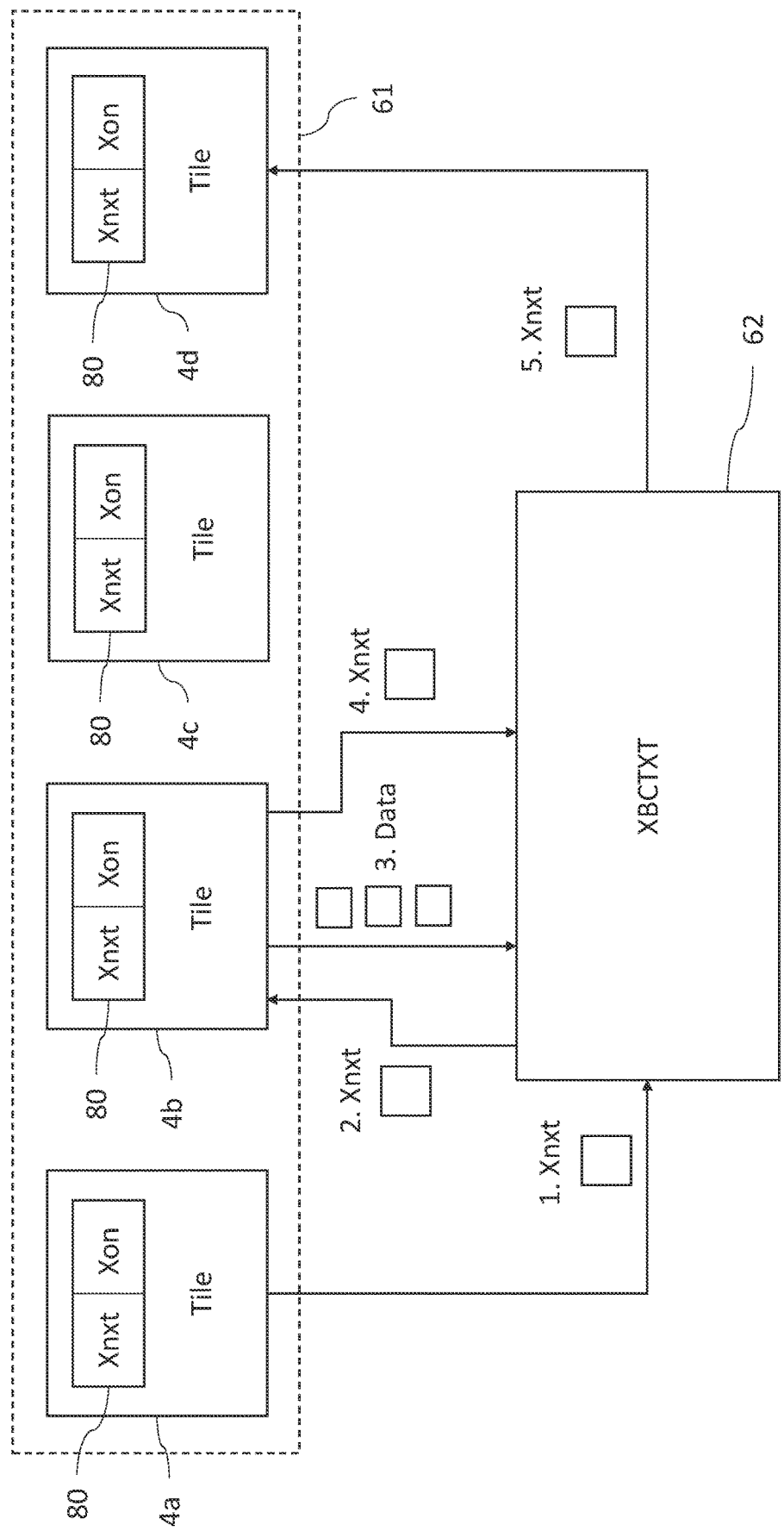
FIG. 8 illustrates an example of the passing of permission between processors by an exchange block context.

Reference is made to FIG. 8, which illustrates the co-ordination of the exchange of data packets by an exchange block context 62. A plurality of tiles 4a, 4b, 4c, 4d belonging to a single set 61 of tiles associated with a single exchange block context 62 are shown in FIG. 8. The tiles 4a, 4b, 4c, 4d may collectively be referred to as "tiles 4". The tile 4a may be referred to as the master processor. The tile 4b may be referred to as the first processor. The tile 4d may be referred to as the second processor.

Each of the tiles 4 comprises storage 80 for storing indications that are used to control whether that tile 4 is permitted to send data. The storage holds a first indication, which may be referred to as Xnxt. The Xnxt indication indicates whether the respective tile 4 has been granted exclusive permission amongst the set 61 of tiles 4 to send data. The storage 80 holds a second indication, which may be referred to as Xon, for flow control purposes. The Xon indication indicates whether or not data sending by the respective tile 4 is paused for flow control purposes. The Xnxt and Xon indications may each consist of a single bit held in a register of the relevant tile 4. A tile 4 will only send data if both Xnxt and Xon are set to indicate that data sending by the tile 4 is permitted.

The Xnxt indication held in a tile 4 is set in response to receipt of a message from the exchange block context 62, granting permission for that tile 4 to send data externally to the device 60. When this message is received, processing circuitry of the tile 4 sets the Xnxt indication to indicate that tile 4 is granted permission to send data. This message may take the form of a data packet of a type referred to herein as an Xnxt data packet.

As a default, the Xnxt indication is set to a state indicating that data sending by the respective tile 4 is not permitted. This indication is updated to indicate that the tile 4 has permission to send data in response to receipt of an Xnxt packet at that tile 4. Only one tile 4 in a set 61 of tiles 4 will have its Xnxt indication set to indicate that it has permission to send.

As a default, the Xon indication is set to a state indicating that data sending by the respective tile 4 is not paused, i.e. data sending is permitted if the Xnxt indication is set to indicate that the respective tile 4 has permission to send. This indication is updated to indicate that data sending is paused in response to receipt of the Xoff packet at the tile 4. The setting of the Xon indication is described in detail with reference to FIG. 9.

One of the tiles 4 in a set 61 of tiles 4 is nominated as the master tile for an external exchange phase. In the example of FIG. 8, tile 4a is the master tile. At the start of the exchange phase, the nominated master tile 4a sends a message to the exchange block context 62 indicating which of the tiles 4 in the set 61 is to send data first. The master tile 4a sends this message in response to executing a master sync instruction, which functions in the same manner as the sync instruction discussed above, but additionally causes the master tile 4a to transmit a single message to the exchange block context to select the first tile 4 to send data externally to the device 60. This message sent by the master tile 4a takes the form of an Xnxt data packet, and is shown in FIG. 8 as "1. Xnxt". The tile 4 identified in such a message may be the master tile 4a itself or one of the other tiles 4b, 4c, 4d. In the example shown in FIG. 8, the first tile that is selected to send data is the tile 4b. The 1. Xnxt data packet, therefore, contains an identifier of tile 4b, which is provided to the exchange block context 62.

Following receipt of the Xnxt data packet (i.e. "1. Xnxt" from the master tile 4a), the exchange block context 62 sends a message to the tile 4b to grant permission to the tile 4b to send data. This message takes the form of an Xnxt data packet and is shown in FIG. 8 as "2. Xnxt". Upon receipt of the message, processing circuitry of the tile 4b sets the Xnxt indication in storage 80 of that tile 4b to indicate that the tile 4b has permission to send data.

In response to the setting of the Xnxt indication in the tile 4b, the tile 4b sends one or more data packets to a destination external to the device 60. These one or more data packets are shown in FIG. 8 as "3. Data". The data packets are sent via the exchange block context 62 to an interconnect of the device 60, from where they are routed to their destination over the appropriate interface of the device 60.

Once the tile 4b has sent all of the data packets that it has scheduled to send in response to the grant of permission by the "2. Xnxt" packet, the tile 4b then sends a message to the exchange block context 62, providing an indication to that exchange block context 62 of the next tile 4 that has data to send. This message takes the form of an Xnxt packet and is shown in FIG. 8 as "4. Xnxt". In the example shown in FIG. 8, this message identifies the tile 4d as being the next tile 4 to send data. In addition to sending the "4. Xnxt" message, processing circuitry of the tile 4b also sets the Xnxt indication held in the storage 80 of tile 4b, such that the tile 4b is prevented from sending data.

In response to receipt of the "4. Xnxt" message from tile 4b identifying tile 4d as the next tile to send data, the exchange block context 62 sends a message to tile 4d to grant permission to that tile 4d to send data externally to the device 60. This message is shown as "5. Xnxt" in FIG. 8. In response to receipt of the "5. Xnxt" message, processing circuitry of the tile 4d sets the Xnxt indication in storage 80 of that tile 4d to indicate that the tile 4d has permission to send data. In response to setting of the Xnxt indication in the tile 4d, the tile 4d sends one or more data packets to a destination external to the device 60.

In addition to the use of the Xnxt messages for identifying and granting permission to a tile 4 in a set 61 of tiles 4 to send data, the exchange block context 62 may transmit flow control messages to control the data transmission by the tiles 4. These flow control messages may be sent so as to prevent overflow of a buffer of the exchange block context 62, which temporarily holds the data packets prior to transmitting them to a destination external to the device 60.

A first type of flow control message is defined for disabling the sending of data by a tile 4. This first type of flow control message may be referred to as "Xoff". The Xoff message has the effect of, when received at a tile 4, causing the processing circuitry of the tile 4 to set the Xon indication of the tile 4 such that that tile 4 is prevented from sending data. A second type of flow control message is defined for re-enabling the sending of data by a tile 4. This second type of flow control message is referred to as "Xon". The Xon message has the effect, when received at a tile 4, of causing the processing circuitry of the tile 4 to set the Xon indication such that the tile 4 is re-enabled to send data.

Figure 9:
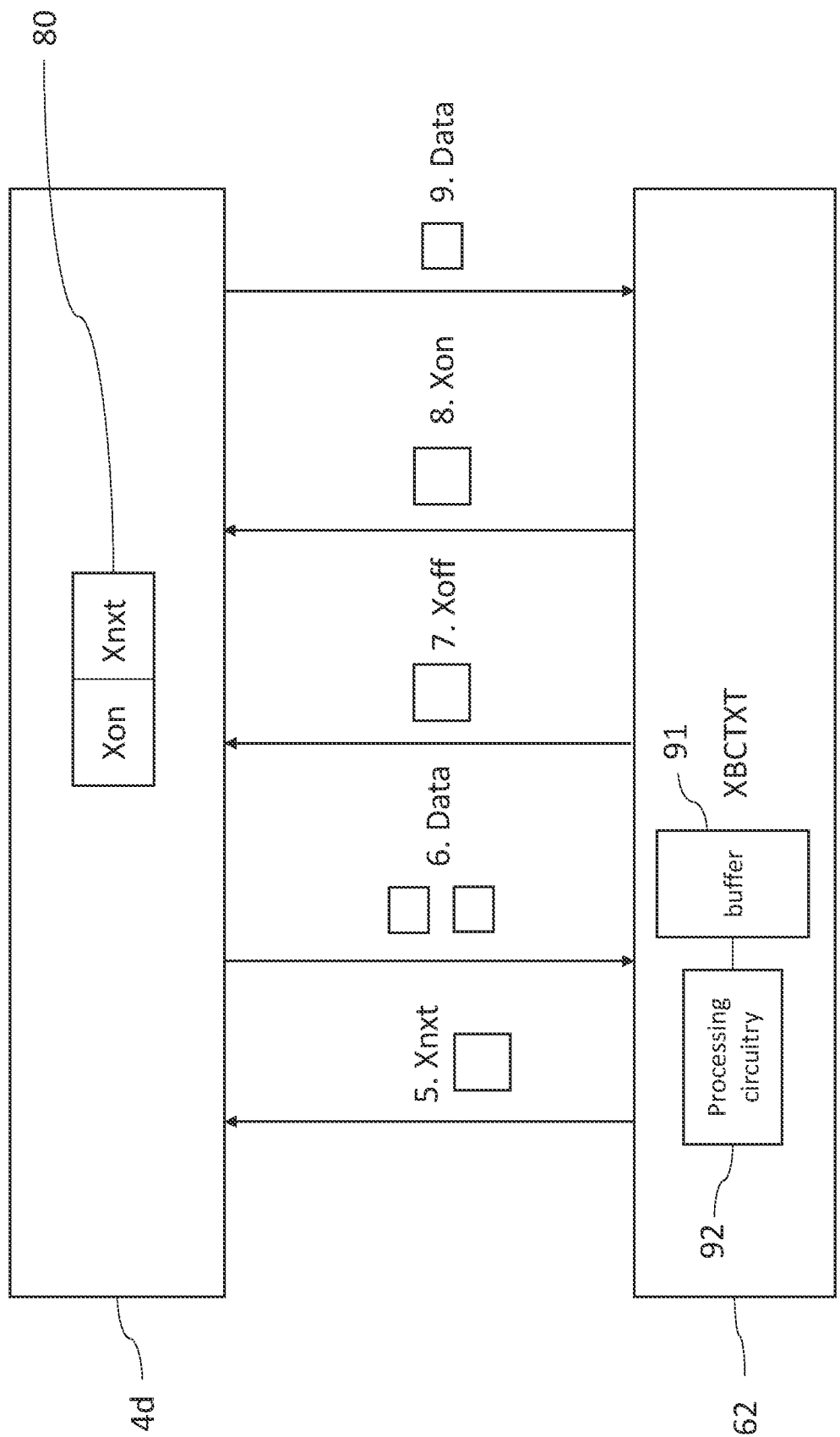
FIG. 9 illustrates an example of the exchange of flow control messages between an exchange block context and a processor.

Reference is made to FIG. 9, which illustrates an example of the exchange of flow control messages and their effects on the transmission of data by a tile 4d. FIG. 9 shows a buffer 91 of the exchange block context 62 for holding data packets transmitted from the tiles 4 associated with that exchange block context 62. Before such data packets are dispatched from the exchange block context 62, the data may be subject to protocol processing to change the packet from a first packet type to a second packet type. The first packet type may be referred to as the "Tlink" packet type, and be a packet format for packets transmitted between the tiles 4 and the exchange block context 62. The second packet type may be referred to as an "Elink" packet type, and be a packet format for packets transmitted between the exchange block contexts 62 and the external interfaces (e.g. interface 70 or interface 77) of the device 60. The data packets are subject to processing by the exchange block context 62 to change the packet type, before being buffered in the buffer 91. The data packets are transmitted from the buffer 91 in the second packet type format to an external interface (e.g. interface 70 or interface 77) of the device 60.

In the example of FIG. 9, the tile 4 shown is the tile 4d from FIG. 8. However, the exchange of flow control messages Xon and Xoff could be performed in the manner shown for any of the tiles 4 of the set 61 of tiles 4 associated with the exchange block context 62 of FIG. 9.

In response to reception of the "5. Xnxt" packet, processing circuitry of the tile 4d starts sending the data that it has scheduled for transmission. This data includes one or more data packets indicated as "6. data" in FIG. 9. These one or more data packets are received at the exchange block context 62, where they are processed to change the packet format, before being buffered in buffer 91 and transmitted onwards from the exchange block context 62 to an external destination.

Processing circuitry 92 of the exchange block context 62 is configured to monitor the fullness of the buffer 91 to determine whether there is risk of an overflow condition occurring. In response to a threshold utilisation of the buffer 91 being reached, the processing circuitry 92 causes an Xoff message to be transmitted from the exchange block context 62 to the tile 4d. This Xoff message is shown in FIG. 9 as "7. Xoff".

In response to receipt of the "7. Xoff" message, processing circuitry of the tile 4d causes the Xon indication in storage 80 to be set such that the tile 4d is prevented from sending data. As a result, the tile 4d ceases the transmission of data to the destination external to the device 60. The tile 4d is prevented from sending data when the Xon indication is set in this way, even if the Xnxt indication is set to indicate that the tile 4d has permission to send data. In other words, both Xon and Xnxt indications in the storage 80 must be set for the tile 4d to send data externally to the device 60.

Since the tile 4d has ceased sending data to the exchange block context 62, the data currently in the buffer 91 may be dispatched, without new data arriving at the buffer 91. As a result, the utilisation of the buffer 91 will reduce over time.

The processing circuitry 92 is configured to monitor the buffer utilisation and, once the buffer utilisation drops below a threshold level, to transmit an Xon message to the tile 4d to re-enable data sending by the tile 4d. This Xon message is shown in FIG. 9 as the data packet "8. Xon".

In response to receipt of the Xon data packet, processing circuitry of the tile 4d sets the Xon indication in storage 80 of tile 4d to indicate that data sending by tile 4d is enabled. As a result, the tile 4d resumes the sending of its scheduled data. The sending of this data is shown in FIG. 9 as "9. data".

Figure 12:
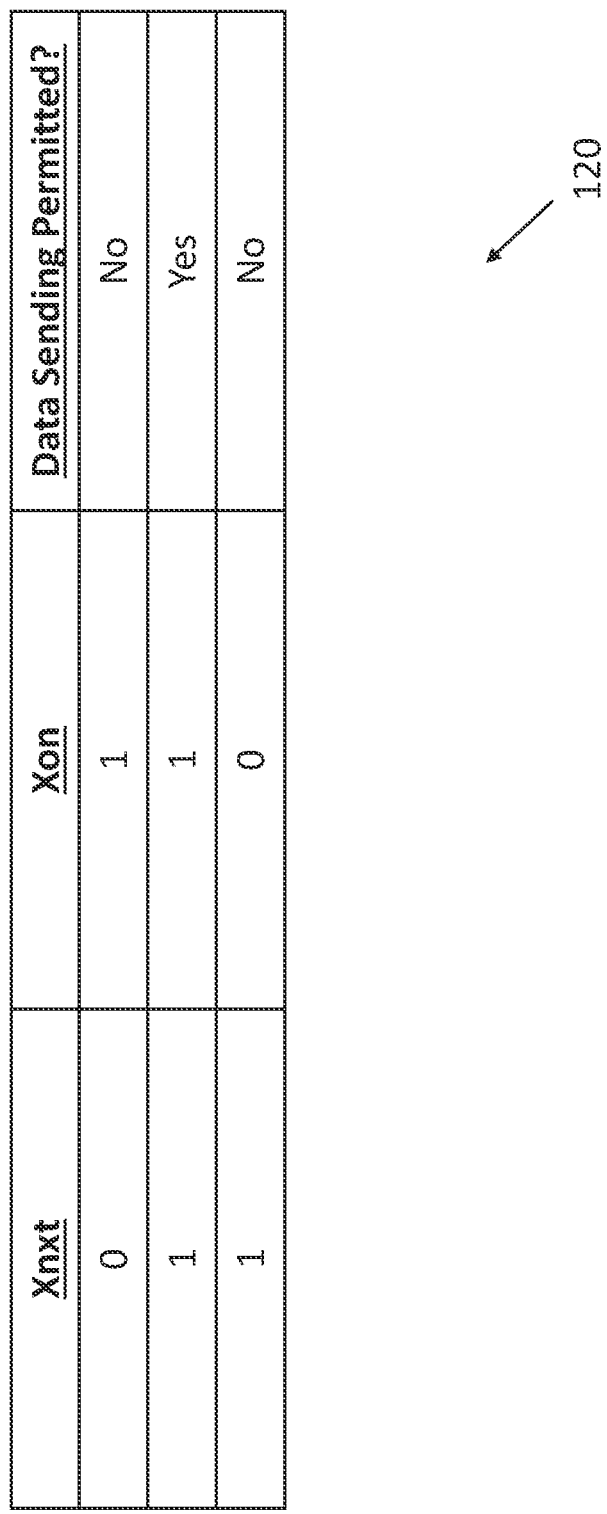
FIG. 12 illustrates an example of the different indications held in a tile and their consequences for the permission of the tile for sending data.

Reference is made to FIG. 12, which illustrates the different states for the indications held in storage 80 and the corresponding consequences for the sending of data by the tiles 4. As shown, the table 120 shows three different possible states for the bits "Xnxt" and "Xon". A zero for either of these bits represents an indication that sending is not permitted for the respective tile 4. Only if both bits are set to one, is a tile 4 configured to send data.

A first state is shown in the table 120. In this first state, the Xnxt bit is set to zero, and the Xon bit is set to one. In this state, the tile 4 will not send data externally to the device 60. This represents the default state of a tile 4 at the start of the exchange phase. A tile 4 will remain in this state until it receives an Xnxt packet (e.g. "2. Xnxt" or "5. Xnxt"), causing the Xnxt bit to be set to one.

A second state is shown in the table 120. In this second state, the Xnxt bit is set to one, and the Xon bit is set to one. In this state, the tile 4 will send data externally to the device 60. The tile 4 transitions to this state from the first state upon receipt of an Xnxt packet (e.g. "2. Xnxt" or "5. Xnxt"), causing the Xnxt bit to be set to one. The tile 4 will transition back to the first state after completing the sending of a set of scheduled data, causing the "Xnxt" bit to be set to zero.

A third state is shown in the table 120. In this third state, the Xnxt bit is set to one, and the Xon bit is set to zero. In this state, the tile 4 will not send data externally to the device 60. The tile 4 transitions to this state from the second state upon receipt of an Xoff packet (e.g. "7. Xoff"), causing the Xon bit to be set to zero. The tile 4 transitions to the second state from the third state upon receipt of an Xon packet (e.g. "8. Xon"), causing the Xon bit to be set to one.

Figure 10:
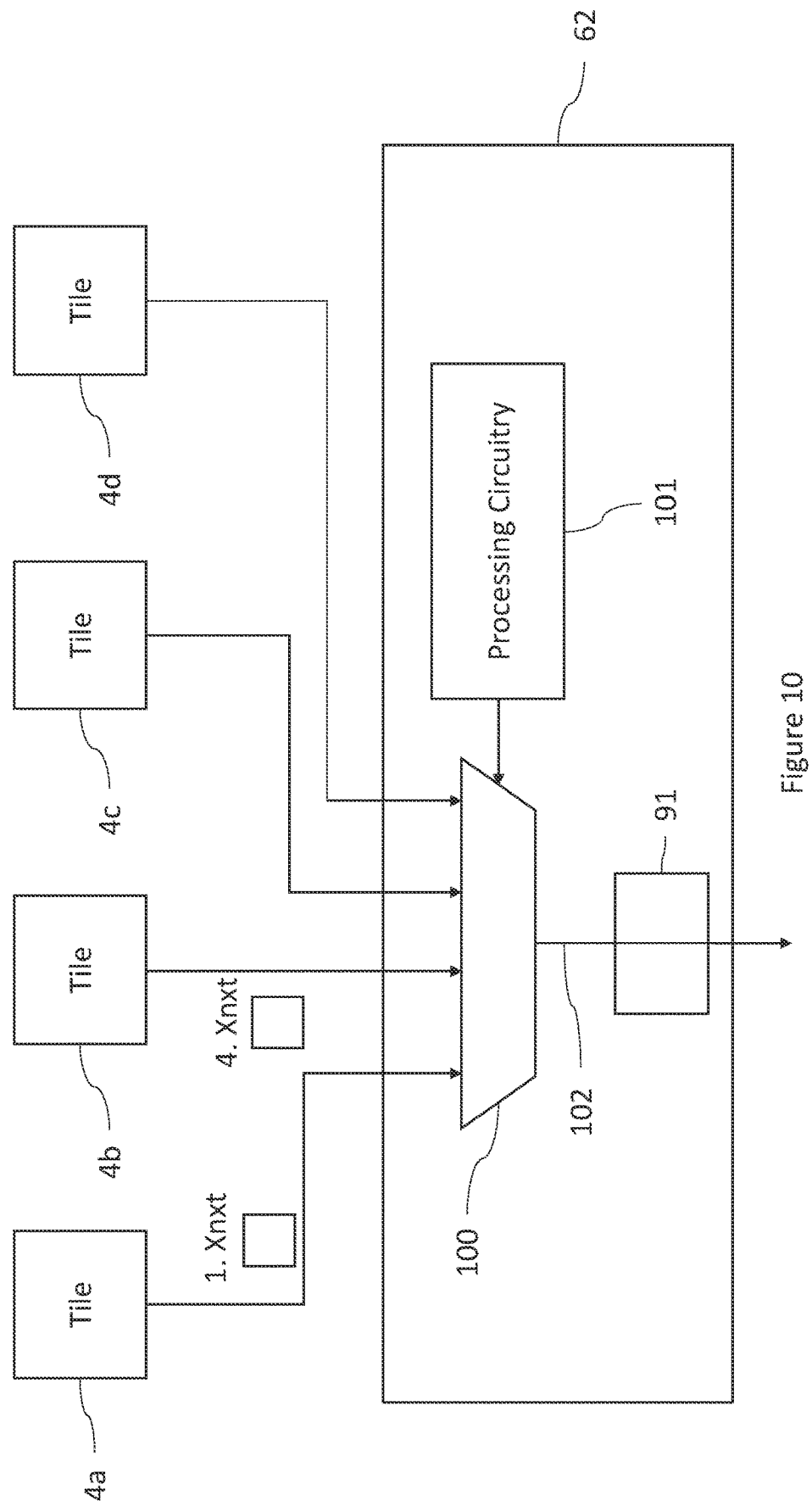
FIG. 10 illustrates an example of the multiplexing of data packets from different tiles at the exchange block context.

Reference is made to FIG. 10, which illustrates the multiplexing of data packets sent by different tiles 4 at the exchange block context 62. The exchange block context 62 includes a multiplexer 100 having a plurality of inputs, with each input being connected to a different one of the tiles 4 for receiving data for sending externally to the device 60. The multiplexer 100 is controlled by processing circuitry 101 of the exchange block context 62. The processing circuitry 101 is responsive to the Xnxt packets received from the tiles 4 and is configured to adjust the multiplexer 100 to select one of the inputs in dependence upon the tile 4 identified in the Xnxt packet. The processing circuitry 101 may be separate to or part of the same unit as the processing circuitry 92 that is shown in FIG. 9.

The multiplexer 100 is configured to output data received at its selected input over output line 102 to be sent externally to the device 60. This data output by the multiplexer 100 is buffered at buffer 91, before being sent externally to the device 60.

Initially, at the start of the exchange phase, the selected input of the multiplexer 100 is that connected to the master tile 4a. This enables the master tile 4a to send the first packet (i.e. "1. Xnxt"), which provides the indication of the first of the tiles 4 for which data is to be sent externally. Each such Xnxt packet includes a field indicating the packet type as being an Xnxt packet type. Such a field enables the processing circuitry 101 of the exchange block context 62 to identify the Xnxt packets and process them as such.

FIG. 10 shows the "1. Xnxt" packet sent from the tile 4a to the exchange block context 62. As discussed above, this packet identifies tile 4b as being the next of the tiles 4 to send data externally. In response to receipt of the "1. Xnxt" packet, the processing circuitry 101 of the exchange block context 62 controls the multiplexer 100 to select the input connected to tile 4b. Therefore, when tile 4b sends its data ("3. Data" shown in FIG. 8, but not shown in FIG. 10), this data is received at the multiplexer 100 and sent to the output of the multiplexer 100 to be sent externally to the device 60.

FIG. 10 shows the "4. Xnxt" packet sent from the tile 4b to exchange block context 62. As discussed above, this packet identifies tile 4b as being the next of the tiles 4 to send data externally. In response to receipt of the "4. Xnxt" packet, the processing circuitry 101 of the exchange block context 62 controls the multiplexer 100 to select the input connected to tile 4d. Therefore, when tile 4d sends its data ("6. Data" and "9. Data", which are shown in FIG. 9, but not shown in FIG. 10), this data is received at the multiplexer 100 and output from the multiplexer 100 to be sent externally to the device 60.

When the set 61 of tiles 4 have completed the sending of their data during an external exchange phase, the final tile 4 in the sequence transmits an Xnxt packet specifying a null tile identifier in place of the identifier of the next tile 4 with data to send. In response to this, the processing circuitry 101 controls the multiplexer 100 to select the input to the master tile 4a, such that the exchange block context 62 is ready to receive a Xnxt packet from the tile 4a in the following exchange phase. For example, in the example in FIGS. 8 and 9, the tile 4d may send a null tile identifier after sending its data (e.g. 6. Data and 9. Data), thus marking the end of sending data by that set 61 of tiles 4 during the exchange phase. The exchange block context 62 comprises a register storing an indication of the identity of the master tile 4a for that context's 62 set 61 of tiles 4, enabling the processing circuitry 101 to select the input to the master tile 4a.

As discussed, the packets that are sent externally (e.g. "3. Data", "6. Data", "9. Data") may be packets (i.e. read requests or write requests) for dispatch to the host 75. In this case, the tiles 4 in the set 61 of tiles discussed with respect to FIGS. 8 to 10 that send data externally may each be I/O tiles 4.

As discussed, the data packets (e.g. "3. Data", "6. Data", "9. Data") that are sent externally by the tiles 4 may be read requests (such as read requests 78 discussed with respect to FIG. 7C). In this case, when a tile 4 has issued a series of read requests that it is scheduled to send before issuing an Xnxt packet, that tile 4 will immediately proceed to issue the Xnxt packet to its associated exchange block context 62, without waiting for receipt of the last of the read completions. The exchange block contexts 62 includes a transmit bus that enables the exchange block context 62 to provide the last read completion to the tile 4 that issued the read requests, whilst another tile 4 in the same set 61 is then issuing a packet (e.g. a further read request) to be sent externally.

Each of the exchange block contexts discussed above may be a circuit or software modules that is provided as part of a hardware unit, referred to as an exchange block 110.

Figure 11:
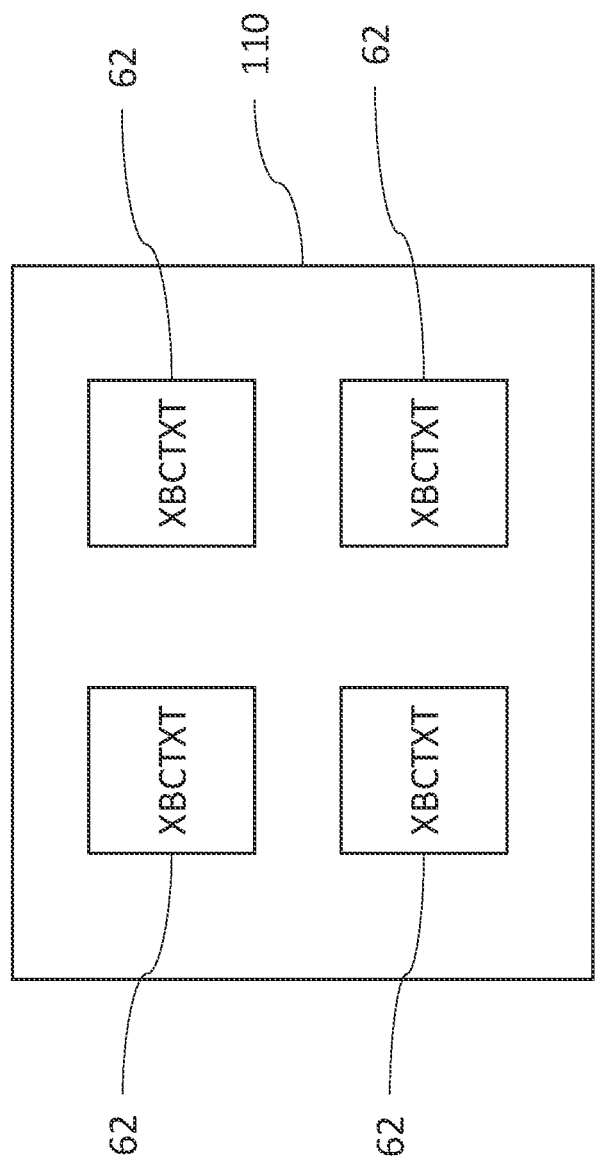
FIG. 11 illustrates an example of an exchange block comprising four exchange block contexts.

Reference is made to FIG. 11, which illustrates an exchange block 110 comprising a plurality of exchange block contexts 62. Each of the exchange block contexts 62 is associated with a separate set 61 of tiles 4 and is configured to perform the operations discussed above with respect to FIGS. 6A to 10.

The processing performed by the exchange block contexts 62 embodied in an exchange block 110 may be performed in different ways. In some embodiments, the exchange block may comprise a processor configured to execute computer readable instructions to perform the operations for each exchange block context 62. In this case, the processing for each exchange block context 62 may be performed by a separate software module executing on the processor of the exchange block 110. In some embodiments, the exchange block context 110 may comprise dedicated 62 processing circuitry for each exchange block context 62 for performing the processing described above as being performed by the exchange block context 62. The dedicated processing circuitry may comprise, for example, an ASIC, an FPGA, or a processor for executing instructions to perform the operations as described.

Each exchange block context 62 may be referred to as an exchange circuit. The circuitry of an "exchange circuit" may be circuitry of the exchange block 110 that is shared between the exchange block contexts 62 or may be dedicated circuitry for an exchange block contexts 62.

Each of the tiles 4 described above is configured to run a set of compiled code for performing the operations as described above. The sequence of many of these operations is predetermined and indicated in the compiled code prior to the loading of the compiled code into the tiles 4, as opposed to being determined at runtime. For example, the barrier synchronisations and corresponding exchange phases are present in the compiled code sets allocated to each tile 4. Each tile 4 will execute its allocated compiled code sequence and participate in a barrier synchronisation upon reaching a sync instruction at a predetermined point in the compiled code sequence. Following this barrier synchronisation, the tiles 4 may send data to an external data source outside of the device 60.

The order of data sending by different tiles 4 is predetermined at compile time and inserted into the code allocated to the tiles 4. As discussed above, the sequence in which tiles 4 of a set 61 send data is determined by the indications contained in the Xnxt packets, which indicate the next tile 4 in the sequence that is scheduled to send data. The indications contained in each Xnxt packet may be predetermined and included in the compiled code sequences allocated to the tiles 4. In this case, when each tile 4 has an Xnxt packet to send, the respective tile 4 inserts the relevant indication of the next tile in the sequence which is to send data as specified by the compiled code sequence allocated to that tile 4.

Figure 13:
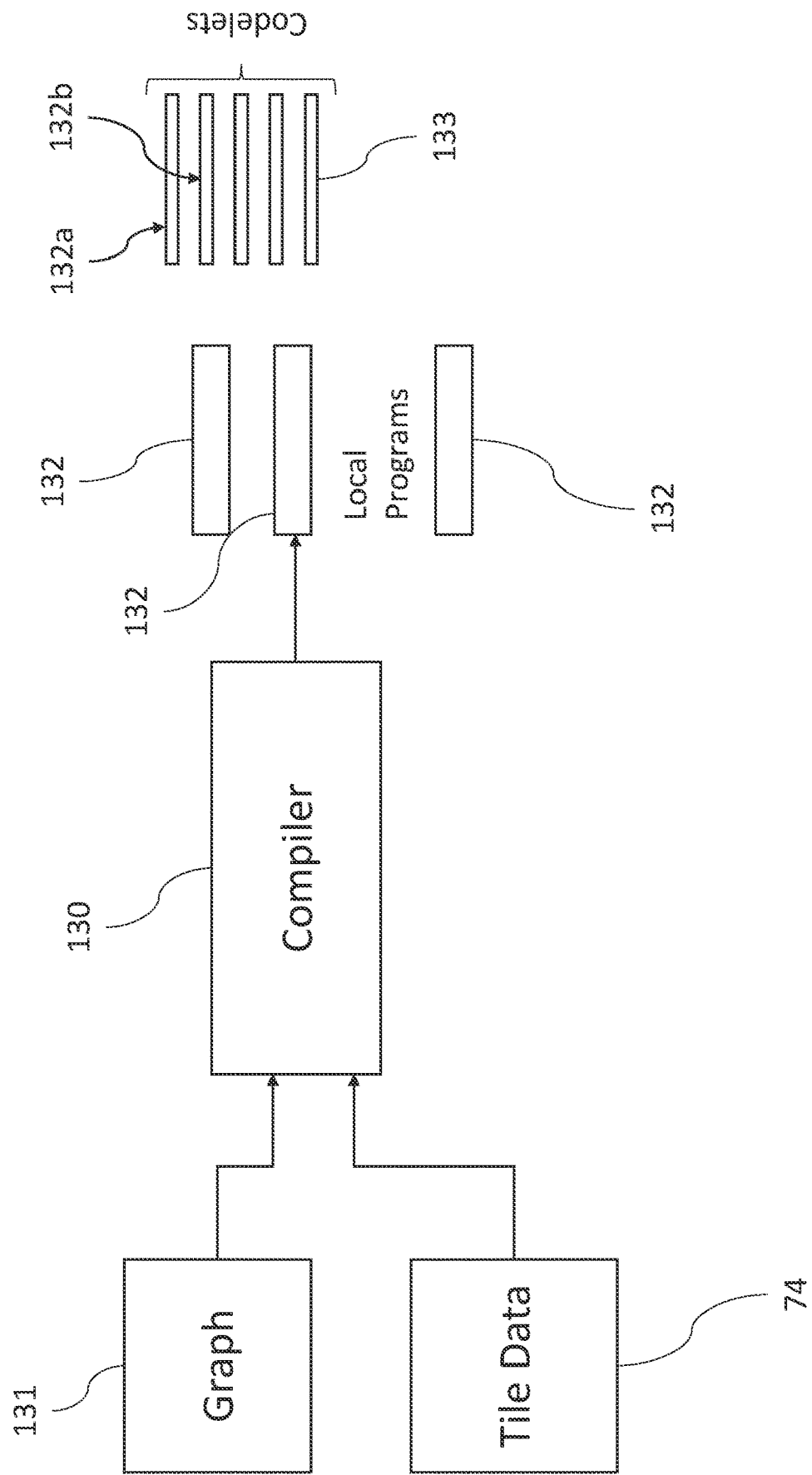
FIG. 13 illustrates an example of the compilation of local programs for execution on each of the tiles.

Reference is made to FIG. 13, which is a schematic diagram illustrating the function of a compiler 130. The compiler 130 produces code to run on all of the tiles 4 of a computer, the "computer" including the device 60 described. The "computer" for which the code sequences are generated may additionally comprise one or more further devices, similar to device 60, with which device 60 is configured to communicate.

The compiler 130 receives such a graph 131 and compiles the functions in the graph 131 into a multiplicity of codelets, which are contained into local programs labelled 132 in FIG. 13. Each local program 132 is designed to be loaded into a particular tile 4 of the computer. Each program comprises one or more codelets forming worker threads 132a, 132b . . . plus a supervisor sub-program 133, each of these being formed of a sequence of instructions. The local programs 72 together form a computer program that runs at least on the device 60.

Figure 14:
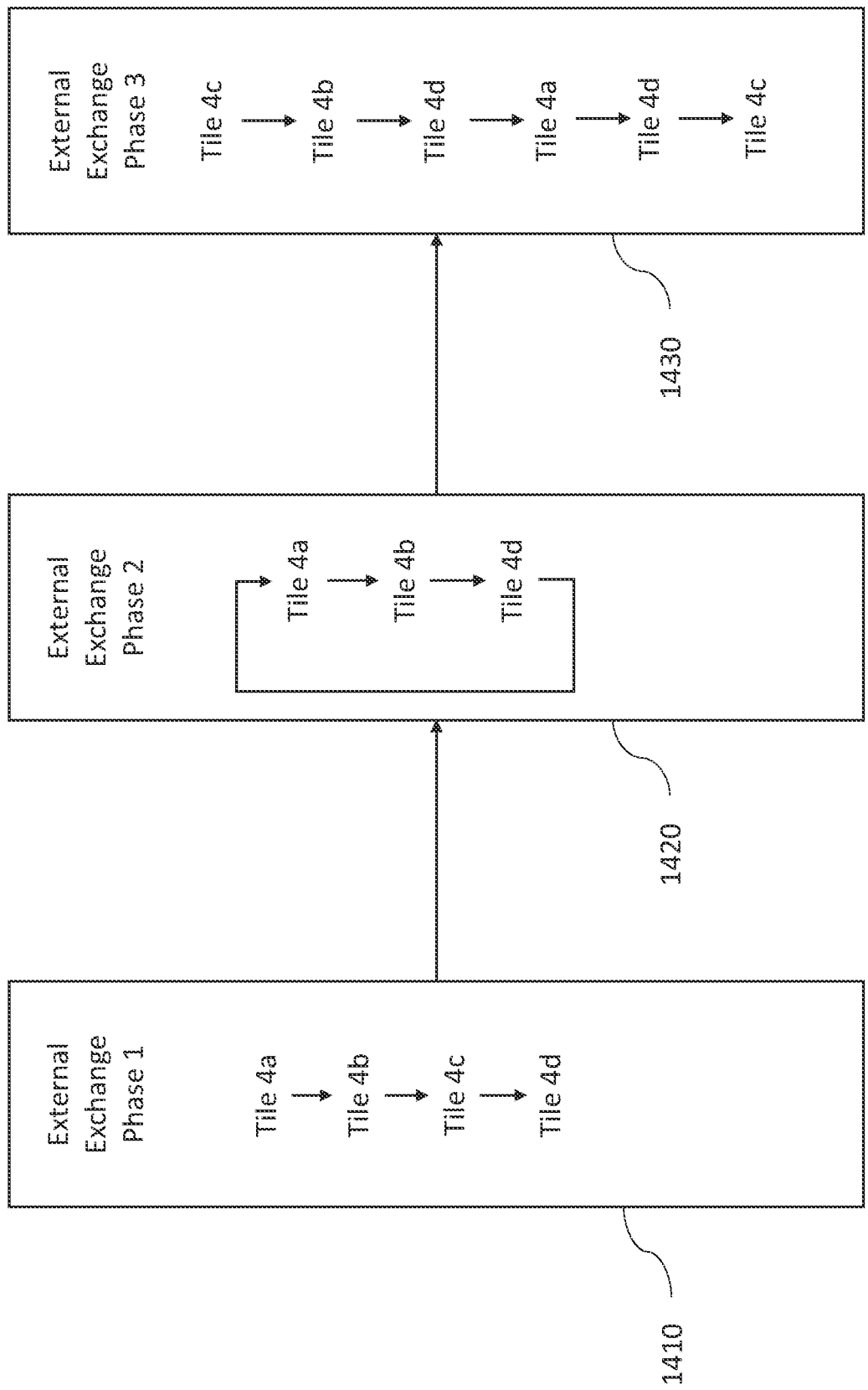
FIG. 14 illustrates examples of the sequences in which tiles may be configured to send data during different exchange phases.

Reference is made to FIG. 14, which illustrates different example sequences of sending by tiles 4 in a set 61. The example tiles 4 are the tiles 4a-4b shown in FIGS. 8 and 10. FIG. 14 shows a plurality of external exchange phases and the order in which the tiles 4 send data during exchange phase. Although not shown in FIG. 14, as may be understood from FIG. 5, each of the external exchange phases would be separated from one another by one or more compute phases and an external barrier synchronisation.

An example of the order in which tiles 4 send data during a first exchange phase 1410 is given. In this exchange phase, the tiles 4 progress through a linear sequence in which each of the tiles 4a is allocated a single period of time in which to send its scheduled data for that exchange phase 1410. Once a tile 4 has sent its data for the exchange phase 1410, it passes permission to the next tile 4 in the sequence by sending an Xnxt packet identifying the next tile 4, and does not send data again until the next exchange phase.

An example of the order in which tiles 4 send data during a second exchange phase 1420 is given. In this exchange phase, a loop is implemented in which tiles 4 send data in the same sequence multiple times during the exchange phase. In the example shown tile 4a sends data during an allocated period of time, followed by tile 4b, followed by tile 4d. Tile 4b identifies, via an Xnxt packet, tile 4a as the next tile 4 in the sequence of tiles 4 with data to send during the following period of time. The sequence then repeats multiple times during the exchange phase.

An example of the order in which tiles 4 send data during a third exchange phase 1430 is given. In this exchange phase 1430, tiles 4 may be allocated multiple separate time periods in which to send data. However, unlike the example exchange phase 1420, the sequence in exchange phase 1430 follows an irregular pattern, rather than a repeating loop.

During the second exchange 1420 and third exchange phase 1430 examples, various tiles 4, during each allocated period of time, only send a portion of the data they have to send for the respective exchange phase 1420, 1430. These types of sequences may, therefore, be useful in the case that tiles 4 are scheduled to send data during an exchange phase, where the values of that data depend upon data to be received during the same exchange phase. For example, a tile 4 may be scheduled to send a first set of data during a first allocated time period of an exchange phase and then, at a later time, following the sending of data by another of the tiles 4 in the same set 61, send a second set of data during a second allocated time period of the exchange phase, where the second set of data is dependent upon data received by the tile 4 between the first and the second allocated time periods. Such operation may be useful for implementing collectives schemes between the device 60 and other similar devices. In this way, it may be unnecessary—when implementing a collective operation (e.g. All-reduce) between a plurality of processing units 2—to divide that collective over a plurality of exchange phases, which would require a plurality of barrier synchronisations.

Figure 15:
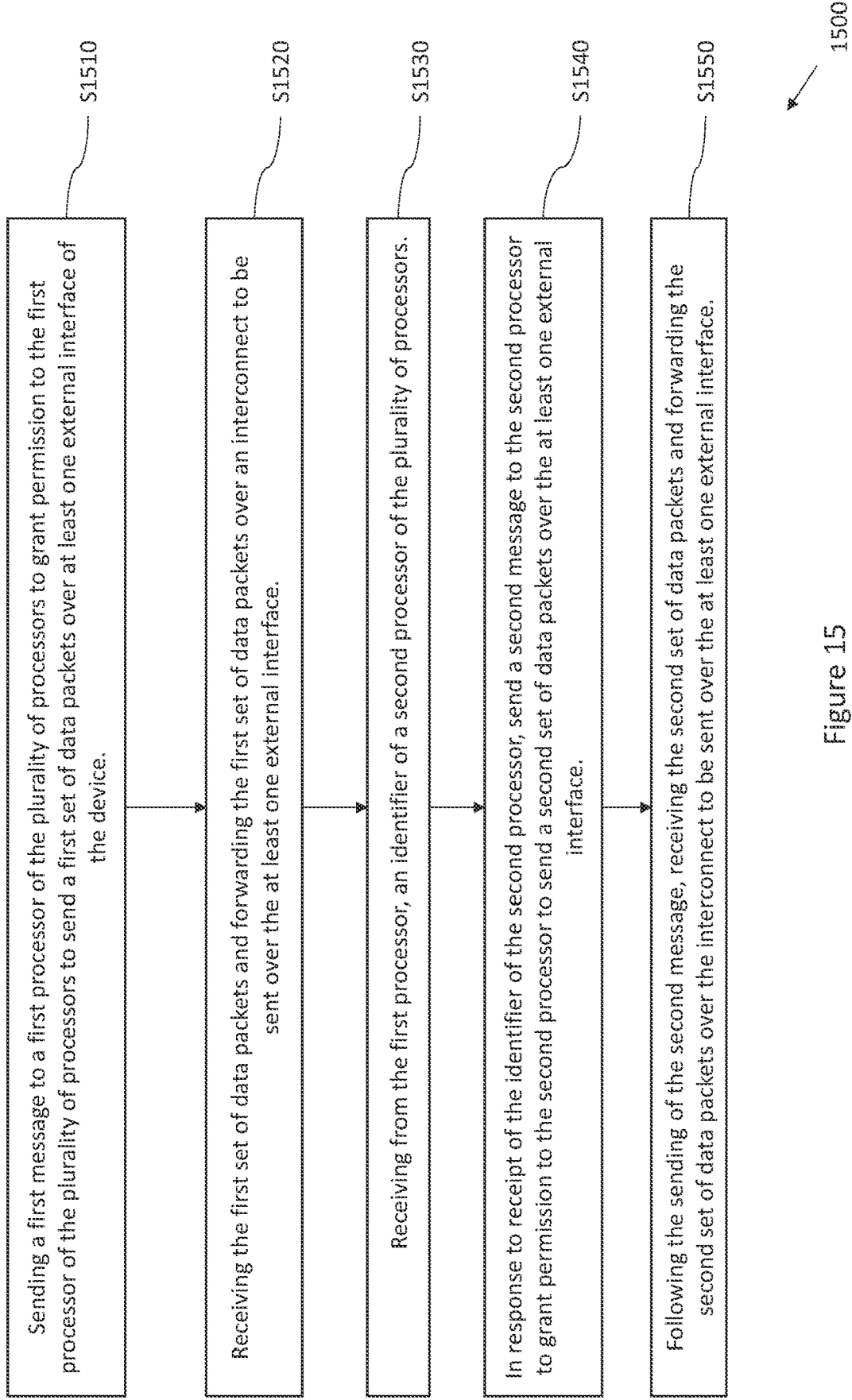
FIG. 15 illustrates a method according to embodiments of the application.

Reference is made to FIG. 15, which illustrates a method 1500 according to embodiments of the application. The method 1500 is implemented in an exchange block context 62 interfacing with a plurality of processors, e.g. a set 61 of processors 4, of device 60.

At S1510, the exchange block context 62 sends a first message to a first processor of the plurality of processors to grant permission to the first processor of the plurality of processors to send a first set of data packets over at least one external interface of the device 60.

At S1520, the exchange block context 62 receives the first set of data packets and forwards the first set of data packets over an interconnect to be sent over the at least one external interface.

At S1530, the exchange block context 62 receives from the first processor, an identifier of a second processor of the plurality of processors.

At S1540, in response to receipt of the identifier of the second processor, the exchange block context 62 sends a second message to the second processor to grant permission to the second processor to send a second set of data packets over the at least one external interface.

At S1550, following the sending of the second message, the exchange block context 62 receives the second set of data packets from the second processor, and forwards them over the interconnect to be sent over the at least one external interface.

It will be appreciated that the above embodiments have been described by way of example only.

The invention claimed is:

1. A data processing device comprising:
a plurality of processors;
at least one exchange circuit for controlling sending of data packets by the plurality of processors,
at least one external interface enabling data packets to be sent to one or more destinations external to the data processing device,
wherein the at least one exchange circuit is configured to send a first message to a first processor of the plurality of processors to grant permission to the first processor of the plurality of processors to send a first set of data packets over the at least one external interface;
wherein the first processor is configured to, in response to receipt of the first message:
  transmit the first set of data packets to one of the destinations external to the data processing device; and
  transmit to the at least one exchange circuit, an identifier of a second processor of the plurality of processors,
wherein the at least one exchange circuit is further configured to, in response to receipt of the identifier of the second processor, send a second message to the second processor to grant permission to the second processor to send a second set of data packets over the at least one external interface,
wherein the second processor comprises a storage storing a first indication, indicating whether the second processor has exclusive permission amongst the plurality of processors to transmit data, wherein the second processor is configured to:
  in response to receipt of the second message, set the first indication to indicate that the second processor has exclusive permission to transmit data; and
  following the sending of the second set of data packets over the at least one external interface, set the indication to indicate that the second processor does not have exclusive permission to transmit data.

2. The data processing device of claim 1, wherein the transmitting the identifier of the second processor comprises transmitting the second message to the at least one exchange circuit.

3. The data processing device of claim 1, wherein at least some processors of the plurality of processors are configured to perform calculations on data to generate results during a compute phase, and to send data over the at least one external interface during an external exchange phase, wherein the compute phase is separated from the external exchange phase by a barrier synchronisation.

4. The data processing device of claim 3, wherein for the external exchange phase, a processor of the plurality of processors is designated as a master processor for the external exchange phase, wherein the master processor is configured to:
transmit to the at least one exchange circuit, an identifier of one of the plurality of processors that is scheduled to transmit data over the at least one external interface during the external exchange phase, prior to transmission of data by any others of the plurality of processors during the external exchange phase.

5. The data processing device of claim 1, wherein the at least one exchange circuit is configured to:
receive a first subset of the second set of data packets from the second processor at a buffer;
monitor utilisation of the buffer; and
in response to determining that utilisation of the buffer has reached or exceeded a threshold, transmit a first flow control data packet to the second processor to cause the second processor to pause sending data.

6. The data processing device of claim 5, wherein the at least one exchange circuit is configured to:
in response to determining that the utilisation of the buffer has fallen below the threshold, transmit a second flow control data packet to the second processor to cause the second processor to resume sending the second set of data packets.

7. The data processing device of claim 1, wherein the storage of the second processor is configured to store a second indication, indicating whether the second processor is prevented from sending data due to flow control.

8. The data processing device of claim 7, wherein the at least one exchange circuit is configured to:
receive a first subset of the second set of data packets from the second processor at a buffer;
monitor utilisation of the buffer; and
in response to determining that the utilisation of the buffer has reached or exceeded a threshold, transmit a first flow control data packet to the second processor to cause the second processor to pause sending data,
wherein the second processor is configured to in response to receipt of the first flow control data packet, set the second indication to indicate that the second processor is prevented from sending data.

9. The data processing device of claim 8, wherein the at least one exchange circuit is configured to in response to determining that the utilisation of the buffer has fallen below the threshold, transmit a second flow control data packet to the second processor to cause the second processor to resume sending the second set of data packets, wherein the second processor is configured to:
in response to receipt of the second flow control data packet, set the second indication to indicate that the second processor is permitted to send data; and resume sending the second set of data packets in response to determining that the first indication and the second indication are set to indicate that the second processor is permitted to send data.

10. The data processing device of claim 1, wherein each processor of the plurality of processors is configured to run a compiled code sequence allocated to that processor.

11. The data processing device of claim 10, wherein the compiled code sequence allocated to the first processor includes the identifier of the second processor.

12. The data processing device of claim 10, wherein for each of least some of the processors of the plurality of processors:
the compiled code sequence allocated to the respective processor includes an identifier of a respective next processor of the plurality of processors from which data is to be transmitted; and
the respective processor is configured to:
transmit data externally to the data processing device; and
following the transmission of data externally to the data processing device,
transmit the identifier of the respective next processor to the at least one exchange circuit.

13. The data processing device of claim 1, wherein the at least one exchange circuit comprises:
a multiplexer having a plurality of inputs, each of the inputs being connected to a different processor of the plurality of processors, the multiplexer having a single output for outputting data to be sent over the at least one external interface; and
processing circuitry configured to:
receive the identifier of the second processor from the first processor; and
in response to the identifier of the second processor, control the multiplexer to select one of the inputs connected to the second processor.

14. The data processing device of claim 1, comprising:
a plurality of sets of processors, each of the sets of processors comprising two or more processors, wherein the plurality of processors is a first set of the plurality of sets of processors; and
a plurality of exchange circuits, each exchange circuit associated with one or more of the sets of processors, the plurality of exchange circuits including the at least one exchange circuit,
wherein each of the plurality of exchange circuits is configured to pass permission for transmitting data externally to the data processing device between processors of its associated set of processors in dependence upon next processor identifiers received from processors currently having permission to send data.

15. The data processing device of claim 1, wherein the first set of data packets are read requests for reading data from an external storage, wherein the first processor of the plurality of processors is configured to distribute at least some of the data read from the external storage by the read requests to other ones of the plurality of processors.

16. The data processing device of claim 1, wherein the first set of data packets are write requests for writing data to an external storage, wherein the first processor of the plurality of processors is configured to, prior to issuing the write requests, receive data to be issued in the write requests from other ones of the plurality of processors.

17. A method for controlling sending of data by a plurality of processors belonging to a device, the method comprising:

sending a first message to a first processor of the plurality of processors to grant permission to the first processor of the plurality of processors to send a first set of data packets over an external interface of the device;

receiving from the first processor, an identifier of a second processor of the plurality of processors;

in response to receipt of the identifier of the second processor, sending a second message to the second processor to grant permission to the second processor to send a second set of data packets over the external interface;

in response to receipt of the second message, setting a first indication to indicate that the second processor has exclusive permission to transmit data; and following sending the second set of data packets over the external interface, setting the indication to indicate that the second processor does not have exclusive permission to transmit data.

18. The method of claim 17, further comprising: the first processor performing calculations on data to generate results during a compute phase and sending data over the external interface during an external exchange phase, wherein the compute phase is separated from the external exchange phase by a barrier synchronisation.

19. The method of claim 18, wherein a third processor of the plurality of processors is designated as a master processor for the external exchange phase, the method further comprising:

the master processor transmitting to an exchange circuit, an identifier of the first processor prior to transmission of data externally to the device by any of the plurality of processors during the external exchange phase.

20. The method of claim 18, wherein for the external exchange phase, the second processor is a last processor scheduled to send data externally to the device during the external exchange phase, the method further comprising the following action performed by the second processor:

after sending a final data packet to be sent over the external interface by the plurality of processors during the external exchange phase, transmitting to an exchange circuit a null processor identifier, which marks an end of transmission by the plurality of processors for the external exchange phase.

21. The method of claim 17, further comprising:
receiving a first subset of the second set of data packets from the second processor at a buffer;
monitoring utilisation of the buffer; and
in response to determining that utilisation of the buffer has reached or exceeded a threshold, transmitting a first flow control data packet to the second processor to cause the second processor to pause sending data.

22. The method of claim 17, further comprising:
in response to determining that utilisation of a buffer has fallen below a threshold, transmitting a flow control data packet to the second processor to cause the second processor to resume sending the second set of data packets.

23. The method of claim 17, wherein the first set of data packets include read requests for reading data from an external storage, wherein the first processor is configured to distribute at least some data read from the external storage by the read requests to other ones of the plurality of processors.

24. The method of claim 17, wherein the first set of data packets include write requests for writing data to an external storage, wherein the first processor is configured to, prior to issuing the write requests, receive data to be issued in the write requests from other ones of the plurality of processors.

25. The method of claim 17, further comprising:
after sending the first message, receiving the first set of data packets and forwarding the first set of data packets over an interconnect to be sent over the external interface; and
after sending the second message, receiving the second set of data packets and forwarding the second set of data packets over the interconnect to be sent over the external interface.

26. A non-transitory computer readable medium storing a computer program comprising computer readable instructions, which when executed by at least one processor causes a method for controlling sending of data by a plurality of processors belonging to a device to be performed, the method comprising:

sending a first message to a first processor of the plurality of processors to grant permission to the first processor of the plurality of processors to send a first set of data packets over at least one external interface of the device;

receiving from the first processor, an identifier of a second processor of the plurality of processors; and in response to receipt of the identifier of the second processor, sending a second message to the second processor to grant permission to the second processor to send a second set of data packets over the external interface;

in response to receipt of the second message, setting a first indication to indicate that the second processor has exclusive permission to transmit data; and following sending the second set of data packets over the external interface, setting the indication to indicate that the second processor does not have exclusive permission to transmit data.

27. The non-transitory computer readable medium of claim 26, the method further comprising:
after sending the first message, receiving the first set of data packets and forwarding the first set of data packets over an interconnect to be sent over the external interface; and
after sending the second message, receiving the second set of data packets and forwarding the second set of data packets over the interconnect to be sent over the external interface.

28. A data processing device comprising:
a plurality of processors;
at least one exchange circuit for controlling sending of data packets by the plurality of processors,
at least one external interface enabling data packets to be sent to one or more destinations external to the data processing device,
wherein the at least one exchange circuit is configured to send a first message to a first processor of the plurality of processors to grant permission to the first processor of the plurality of processors to send a first set of data packets over the at least one external interface;
wherein the first processor is configured to, in response to receipt of the first message:
transmit the first set of data packets to one of the destinations external to the data processing device; and
transmit to the at least one exchange circuit, an identifier of a second processor of the plurality of processors, wherein the at least one exchange circuit is further configured to, in response to receipt of the identifier of the second processor, send a second message to the second processor to grant permission to the second processor to send a second set of data packets over the at least one external interface, wherein at least some processors of the plurality of processors are configured to perform calculations on data to generate results during a compute phase, and to send data over the at least one external interface during an external exchange phase, wherein the compute phase is separated from the external exchange phase by a barrier synchronisation, wherein for the external exchange phase, the second processor is a last processor scheduled to send data during the external exchange phase, wherein the second processor is configured to:

after sending a final data packet to be sent over the at least one external interface by the plurality of processors during the external exchange phase, transmit to the at least one exchange circuit, a null processor identifier, marking an end of transmission by the plurality of processors for the external exchange phase.

29. A data processing device comprising:
a plurality of processors, wherein each processor of the plurality of processors is configured to run a compiled code sequence allocated to that processor, wherein the compiled code sequence allocated to a first processor of the plurality of processors includes an identifier of a second processor of the plurality of processors;
at least one exchange circuit for controlling sending of data packets by the plurality of processors,
at least one external interface enabling data packets to be sent to one or more destinations external to the data processing device,
wherein the at least one exchange circuit is configured to send a first message to the first processor of the plurality of processors to grant permission to the first processor of the plurality of processors to send a first set of data packets over the at least one external interface;
wherein the first processor is configured to, in response to receipt of the first message:
transmit the first set of data packets to one of the destinations external to the data processing device; and
transmit to the at least one exchange circuit, a packet comprising the identifier of the second processor of the plurality of processors as specified by the compiled code sequence allocated to the first processor,
wherein the at least one exchange circuit is further configured to, in response to receipt of the packet comprising the identifier of the second processor, send a second message to the second processor to grant permission to the second processor to send a second set of data packets over the at least one external interface.

* * * * *